United States Patent [19]

Bilski et al.

[11] Patent Number: 5,101,494
[45] Date of Patent: Mar. 31, 1992

[54] SYSTEM FOR PRODUCING MEMORY MAPS BY INTERPRETING A DESCRIPTOR FILE WHICH IDENTIFIES AND DESCRIBES THE DATA STRUCTURES PRESENT IN MEMORY

[75] Inventors: Maryann J. Bilski, Waltham, Mass.; Edson O. Vermilion, Windham, N.H.; Jang-Li Chang, Dracut, Mass.

[73] Assignee: Bull HN Information Systems Inc., Billerica, Mass.

[21] Appl. No.: 494,820

[22] Filed: Mar. 15, 1990

Related U.S. Application Data

[63] Continuation of Ser. No. 913,157, Sep. 26, 1986, abandoned.

[51] Int. Cl.$^5$ .............................................. G06F 11/32
[52] U.S. Cl. .............................. 395/700; 364/DIG. 1; 364/267.5; 364/267.8
[58] Field of Search ... 364/200 MS File, 900 MS File

[56] References Cited

U.S. PATENT DOCUMENTS

| | | | |
|---|---|---|---|
| 3,792,447 | 2/1974 | Behz et al. | 364/200 |
| 4,068,300 | 1/1978 | Bachman | 364/200 |
| 4,453,217 | 6/1984 | Boivie | 364/200 |
| 4,462,077 | 7/1984 | York | 364/200 |
| 4,533,997 | 8/1985 | Furgerson | 364/300 |
| 4,541,056 | 9/1985 | Matthews | 364/300 |
| 4,558,413 | 12/1985 | Schmidt | 364/300 |
| 4,597,044 | 6/1986 | Circello | 364/200 |
| 4,633,430 | 12/1986 | Cooper | 364/900 |

Primary Examiner—Thomas C. Lee
Assistant Examiner—Richard Lee Ellis
Attorney, Agent, or Firm—David M. Driscoll; Faith F. Driscoll; John S. Solakian

[57] ABSTRACT

A computer memory interpretation file, or structures file, enables automatic location and interpretation of memory resident components of operating system programs, user programs, data buffers, and the like. The structures file contains sufficient information pertaining to each control structure to allow a program using it to identify and locate each iteration of any component that may be memory resident. The structures file relieves the program of requiring reference definitions pertaining to the control structures or their sub-components and eliminates the requirement for programming logic normally necessary to recognize and perform specialized operations determined by the nature of the control structure being processed.

16 Claims, 23 Drawing Sheets

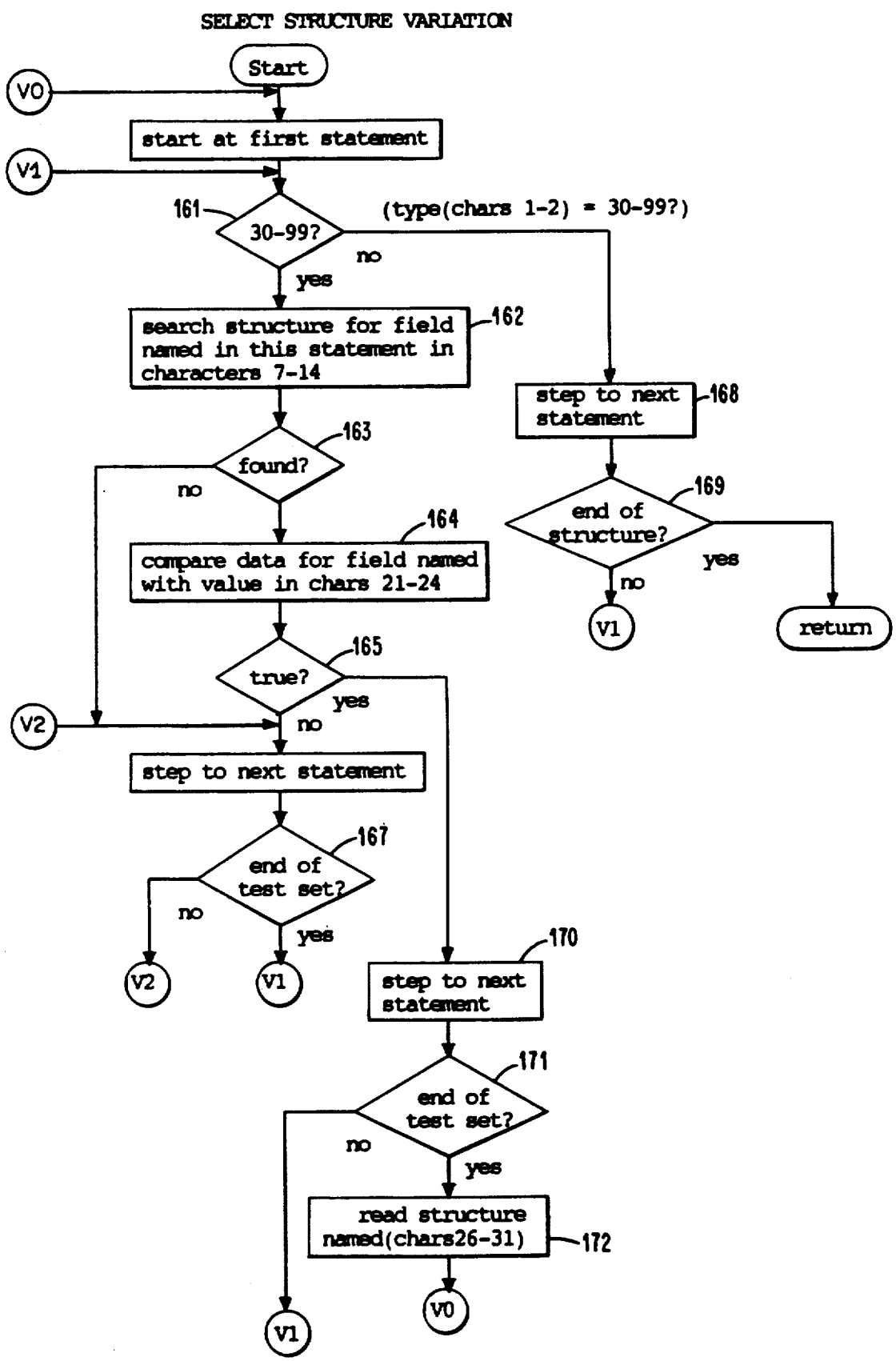

| 1 | 2 | 3 | 6 | 7 | 14 | 15 | 20 | 21 | 24 | 25 | 31 | 32 | 62 |
|---|---|---|---|---|---|---|---|---|---|---|---|---|---|
| TYPE | | OFFSET | | NAME | | STRUCTURE | | MASK | | | | PURPOSE | |

*Fig. 15A.*

| 1 | 2 | 3 | 8 | 9 | 62 |
|---|---|---|---|---|---|
| 00 | | NAME | | | |

*Fig. 15B.*

| 1 | 2 | 3 | 62 |
|---|---|---|---|
| 01 | | STRUCTURE_FIELD, . . . . ; | |

*Fig. 15C.*

| 1 | 2 | 3 | 6 | 7 | 14 | 15 | 20 | 21 | 24 | 25 | 26 | 31 | 32 | 62 |
|---|---|---|---|---|---|---|---|---|---|---|---|---|---|---|
| NN | | OFFSET | | FIELD NAME | | | | VALUE | | C | STRUCTURE | | COMMENTS | |

*Fig. 15D.*

| 1 | 2 | 3 | 6 | 7 | 14 | 15 | 20 | 21 | 24 | 25 | 31 | 32 | 62 |
|---|---|---|---|---|---|---|---|---|---|---|---|---|---|
| 1X | | | | NAME | | | | SIZE | | | | ACCUMULATOR | |

*Fig. 15E.*

| 1 | 2 | 3 | 6 | 7 | 14 | 15 | 22 | 23 | 24 | 31 | 32 | 62 |
|---|---|---|---|---|---|---|---|---|---|---|---|---|
| 2X | | VALUE | | NAME 1 | | NAME 2 | | C | NAME 3 | | COMMENT | |

*Fig. 15F.*

| SF Key | SF Record |
|--------|-----------|
| HW | [Hierarchy descriptor] (Link=0)<br>[15 more statements] |
| SCB | [Hierarchy descriptor] (Link to SCB1)<br>[15 more statements] |
| SCB1 | [Hierarchy descriptor] (Link to SCB2] (Link=0)<br>[10 more statements) |
| GCB | [Hierarchy descriptor] (Link=0)<br>[12 more statements) |

*Fig. 16.*

A STRUCTURE 00 names structure 01 allows fast access

[1x] provides temporary
work space

[2x] operates on temporary
work space

[30-99] allows appropriate
selection of variable
structure descriptions

[ax] defines data fields of
structure content

*Fig. 17.*

```
A- field offset
    B- field name
        C- memory content
                        D- field description A0000  G_GCBQ   0009D300          LINK TO NEXT GCB
A0002  G_NAME   07                GROUP NAME
A0003  G_IND    0000              INDICATORS WORD
A0004  G_IND2   8020              2ND INDICATORS WORD
A0005  G_IND3   0000              3RD INDICATORS WORD
A0006  G_FCP    0000              FIXED_TO_CP BIT AND CHANNEL
A0007  G_BLVL   0029              GROUP BASE LEVEL
A0008  G_EXSW   0000              EXTERNAL SWITCHES
A0009  G_XRQC   0001              EXTERNAL REQUEST COUNT
A000A  G_MPD    0004F4E7          → GROUPS MPD
A000C  G_MEMP   P1                MEMORY POOL NAME
A000D  G_LKQM   0000              QUEUED MEMORY LOCK WORD
A000E  G_HOQM   03800079          HOQ OF QUEUED MEMORY
A0010  G_EOQM   03800071          EOQ OF QUEUED MEMORY
A0012  G_STSA   00000000          CHAIN OF FREE SOFTWARE TSAS
A0014  G_TCBQ   0005B5F8          QUEUE OF GROUP TCBS
A0016  G_LTCB   0005AA58          → LEAD TASK TCB
A0018  G_LRNS   07D0              HIGHEST LRN
A0019  G_LFNS   07D0              HIGHEST LFN
A001A  G_LRT    03800081          → GROUPS LRT
A001C  G_LFT    038010B3          → GROUPS LFT
A001E  G_SEMP   0009C7BA          → LOCK SEMAPHORE - GCB/LRT
A0020  G_WD     0009BA60          → WD DDB
A0022  G_EROF   038020F0          → ERROR OUT FILE FCB
A0024  G_UOF    038020F0          → USER OUT FCB
A0026  G_BPP    00000000          → GROUPS BUFFER POOLS
A0028  G_SEMQ   00000000          → LIST OF DEFND SEMS
A002A  G_AM     0009C86E          → MSG ID ARRAY
```

Fig. 18.

```
         A- field offset
              B- field name
                                    C- field description
              ↓     ↓                        ↓

Q 0000G_GCBQ    GCB     MMMMHHHHHHLINK TO NEXT GCB
ID0002G_NAME            SSSSSS0002HHHHHHGROUP NAME
F 0003G_IND             SSSSSSFFFFHHHHHHINDICATORS WORD
B 0003MG_ABT                  8000HHHHHHHABORTED
B 0003MG_SSP                  4000HHHHHHHSUSPEND IN PROGRESS (OR DONE)
B 0003MG_DEL                  2000HHHHHHHDELETED
B 0003MG_REA                  1000HHHHHHHRETURN ERRORS TO APPLICATION
B 0003MG_MBQ                  0800HHHHHHHDISK QUEUED GROUP REQUESTS
B 0003MG_SSC                  0400HHHHHHHSUSPEND COMPLETED
B 0003MG_NPR                  0200HHHHHHHNEW PROCESS IN PROGRESS
B 0003MG_BRK                  0100HHHHHHHGROUP IN OIM BREAK MODE
B 0003MG_TTL                  0080HHHHHHHGROUP USING TOTAL DATA BASE
B 0003MG_RDN                  0040HHHHHHHECL PROCESSOR READY ON SWITCH
B 0003MG_RST                  0020HHHHHHHRESTART IN PROGRESS
B 0003MG_NPE                  0010HHHHHHHNEW PROC WITH ERROR REPORTING
00GCB1  GCB2
B 0003MG_DRM                  0008HHHHHHHMBX QD REQUESTS AND DORMANT
B 0003MG_PRV                  0004HHHHHHHPRIVELEGED GROUP
B 0003MG_SYS                  0002HHHHHHHSYSTEM GROUP
B 0003MG_BG                   0001HHHHHHHBATCH TASK GROUP
F 0004G_IND2            SSSSSSFFFFHHHHHH2ND INDICATORS WORD
B 0004MG_ECL                  8000HHHHHHHECL LEAD TASK
B 0004MG_MCA                  4000HHHHHHHMESSAGE CHAINING ALLOWED
B 0004MG_NBK                  2000HHHHHHHPCL BREAK FUNCTION DISABLED
B 0004MG_TR0                  1000HHHHHHHFORCE RING 0 FOR PRIV GROUP
B 0004MG_CPR                  0800HHHHHHHCPU TIME UPDATE COMPLETE
B 0004MG_RRS                  0400HHHHHHHLEAD TASK DOING REAL RESTART
B 0004MG_RER                  0200HHHHHHH2ND RESTART ERROR OCCURED
B 0004MG_RTP                  0100HHHHHHHRESTART TRAP
B 0004MG_RSE                  0080HHHHHHHRESTART ERROR
B 0004MG_CLR                  0040HHHHHHHPURGE RETURN MEMORY CONTENTS
00GCB2  GCB3
B 0004MG_CAC                  0020HHHHHHHCOMMAND ACCOUNTING      *
B 0004MG_FSC                  0010HHHHHHHFORCED SWAP REQUEST COMPLETED
B 0004MG_NSK                  0008HHHHHHHINHIBIT PCL GWS SHRINKAGE
```

*Fig. 19.*

```
PRINTING FROM 9C720 TO 9C7B8
APHYSICAL START ADDRESS = 9C720
A0009C720  0009 D300 3037 0000 8020 0000 0000 0001 0004 F4E7 5031 0000 0380 0079
A0009C730  0380 0071 0000 0000 0005 B5F8 0005 AA58 07D0 0380 0081 10B3 0009 C7BA
A0009C740  0009 BA60 0380 20F0 0380 20F0 0000 0000 0000 0009 C86E 0000 0000 0000
A0009C750  0009 F803 0001 1C2E 0390 01A0 0000 0000 0000 0000 0000 0000 0000 0000
A0009C760  0000 0000 0000 0000 0000 0042 0000 0000 012C 0000 0079 0000 0001 0000
A0009C770  0001 0000 0000 0003 0000 004B 0000 0000 0041 0380 0041 0000 0000 007D
A0009C780  0380 007D 0000 0000 0380 0045 0380 005D 0380 0000 0000 0000 0380 594E
A0009C790  4E20 2020 2020 2020 0000 535F 4144 4049 4E20 2020 3037 2020 464C 0000
A0009C7A0  0000 0000 0000 0000 0000 0000 0000 0000 0000 4020 0000 0000 0000 0000
A0009C7B0  0000 0000 0000 0000 0000 0000 000
```

*Fig. 20.*

```
XRAY Current Path: HW,SCB
ZONE1 Structure: SCB          Address:V=000004E8  P=000004E8      Mode:FULL¹
0000 S_IHOQ    000118E6         HEAD OF FREE IRB QUEUE
0002 S_IEOQ    00012F84         END OF FREE IRB QUEUE
0004 S_LKWD    00004004         →GLOBAL LOCKWORD
0006 S_GCB     0009E780         QUEUE OF GCBS
0008 S_SAQ     0000AA9B         →SOFTWARE ACTIVE QUEUE *
000A S_DFAQ    0005158B         →DEFERRED ACTIVE QUEUE
000C S_IND     F23A             INDICATORS WORD
000D S_IND2    BBAF             2ND INDICATOR WORD
ZONE2 Structure: HW           Address:V=00000000  P=00000000      Mode:FULL
0003 SFWLEVEL  DFFF             SOFT FIRMWARE REL. (DPS6-PLUS)
0020 Level00   8000             LEVEL00 ACTIVE
0023 Level63   0001             LEVEL 63 ACTIVE Command:P
```

Fig. 24.

```
XRAY Current Path: HW,SCB
ZONE1 Structure: SCB          Address:V=000004E8  P=000004E8      Mode:FULL²
0000 S_IHOQ    000118E6         HEAD OF FREE IRB QUEUE
0002 S_IEOQ    00012F84         END OF FREE IRB QUEUE
0004 S_LKWD    00004004         →GLOBAL LOCKWORD
0006 S_GCB     0009E780         QUEUE OF GCBS
0008 S_SAQ     0000AA9B         →SOFTWARE ACTIVE QUEUE *
000A S_DFAQ    0005158B         →DEFERRED ACTIVE QUEUE
000C S_IND     F23A             INDICATORS WORD
000D S_IND2    BBAF             2ND INDICATOR WORD
ZONE2 Structure:GCB           Address:V=0009E780  P=0009E780      Mode:FULL
0000 G_GCBQ    0009C720         LINK TO NEXT GCB
0002 G_NAME    BG               GROUP NAME
0003 G_IND     0004             INDICATORS WORD
0004 G_IND2    C820             2ND INDICATORS WORD
0005 G_IND3    1802             3RD INDICATORS WORD
0006 G_FCP     0000             FIXED_TO_CP BIT AND CHANNEL
0007 G_BLVL    0028             GROUP BASE LEVEL
0008 G_EXSW    0000             EXTERNAL SWITCHES Command:P
```

Fig. 25.

SYSTEM FOR PRODUCING MEMORY MAPS BY INTERPRETING A DESCRIPTOR FILE WHICH IDENTIFIES AND DESCRIBES THE DATA STRUCTURES PRESENT IN MEMORY

This application is a continuation of application Ser. No. 913,157, filed Sept. 26, 1986, now abandoned.

BACKGROUND OF THE INVENTION

1. Technical Field

The present invention relates in general to a technique for allowing programmers to generate customized displays from memory or from memory dumps, in order to carry out problem analysis of operating systems/programs with differing internal structural format.

2. Prior Art Systems

Computer operating systems characteristically use control structures to maintain order in processing. The control structures of an operating system are small collections of related information pertaining to some feature of the operating system. The system software programs that use these control structures have descriptions thereof embedded in the program code. Refer for example to the dump program referred to as Dpedit used in association with the Honeywell MOD 400 Operating System. Because these descriptions are embedded in the compiled or assembled program code, whenever improvements or alterations are made to an operating system requiring any altering or adding to the control structures, it is necessary to recompile or reassemble any programs that use those control structures that were altered. This becomes a time consuming task. Furthermore, in the past more than one version of a processing program would have to be maintained. When changes occurred to the operating system it was common to simply provide a new recompiled version of a structure-dependent dump program to customers. This meant that multiple versions of the dump program had to be maintained.

SUMMARY OF THE INVENTION

To accomplish the foregoing and other objects, features and advantages of the invention there is provided a control structures file that is adapted to provide a service to and be accessed by a dump program or routine. Information previously stored in the dump (utility) program which is variable is now accessed via the structures file. This means that control structure updating does not involve program alteration. Furthermore, the need to provide and maintain multiple versions of the utility program so as to support multiple sets of the information is eliminated. The process of using customized structure files and a single processing program allows a user to carry out problem analysis on different systems or different versions of the same system by using the same command set. The command choices available to the user are independent of the kind of internal format of the memory entity being analyzed.

In brief, in accordance with the invention there is provided a process for generating a logical display of memory values in response to commands generated by a user for any one of a number of different versions of a program employing different control structures. The process broadly comprises the steps of storing a plurality of descriptors coded for describing all of the control structures used by the program, accessing the descriptors in an order specified by the user, and interpreting the accessed descriptors to generate a logical display of the control structure data described by the descriptors for the program.

In summary one feature of the present invention is to provide, in association with the dump program, a control structures file adapted to hold the descriptions of all of the control structures, from which the processing de-bugging program can dynamically load and use the particular structure needed at any one point in time.

Another feature of the present invention is to provide a single version of processing program adapted to support all versions of control structure sets.

A further feature of the present invention is to provide a control structures file as in accordance with the preceding objects and in which the updating of a file of control structures to fit a new software release can be carried out by an automated process using the new structure templates as the input.

Still another feature of the present invention is to provide a structures file to contain control structure descriptions in a usable and easily updatable format so as to not require program recompilation when structures change.

Another feature of the present invention is to provide a structures file in which the processing program is able to access any number of these files each containing a set of descriptions of control structures applicable to one version of operating system, or alternatively sets of data structure descriptions for other operating systems.

Still another feature of the present invention is to provide a process of using customized structure files in association with a single processing program allowing a user to carry out his own specialized problem analysis on different systems or different versions of the same system using the same command set.

Still another feature of the present invention is to provide a process of using customized structure files to provide the user, unfamiliar with a particular structure, a verbal description of each field of that structure.

Another feature of the present invention is to provide a process of using customized structure files and to provide, for each structure, a hierarchical road map of how to reach that structure so that the processing program can locate and display data automatically for the user.

BRIEF DESCRIPTION OF THE DRAWINGS

Numerous other objects, features and advantages of the invention should now become apparent upon a reading of the following detailed description taken in conjunction with the accompanying drawings, in which:

FIG. 14 is a flow chart of the SELECT STRUCTURE VARIATION function;

FIGS. 15A-15F illustrate different structure-defining statements;

FIG. 16 illustrates an example of a sample structure file;

FIG. 17 illustrates a representative structure descriptor in the form of a series of statements such as the type illustrated in FIGS. 15A-15F;

FIG. 18 illustrates one display format for a full display showing offset, field identification, data and field description;

FIG. 19 is a display of the structures file without memory data;

FIG. 20 is a raw display of memory image for the selected structure;

FIGS. 24 and 25 illustrate two different forms of display format and associated with the operation described in FIG. 23.

DETAILED DESCRIPTION OF THE PREFERRED EMBODIMENT

As has been indicated previously, normally control structures used by an operating system are embedded in the processing program. Thus, whenever improvements are made to an operating system this requires an altering or adding to the control structures and thus requires recompiling or re-linking of the program. In designing the program it is desirable to avoid the need to recompile whenever a structure is changed. Because the processing (dump) program is a development tool this would require recompilation many times during the period that a new release of systems software is being made. Accordingly, in accordance with the invention a separate control structures descriptor file is employed to contain the control structure descriptions in a usable and easily updatable format. The implementation of the structures file is such that its user, the processing program, does not require recompilation when structures change and is furthermore able to access any number of these files each containing a set of control structures applicable to one version of the operating system or alternatively even sets of data structure descriptions for other vendors.

Figure 1:
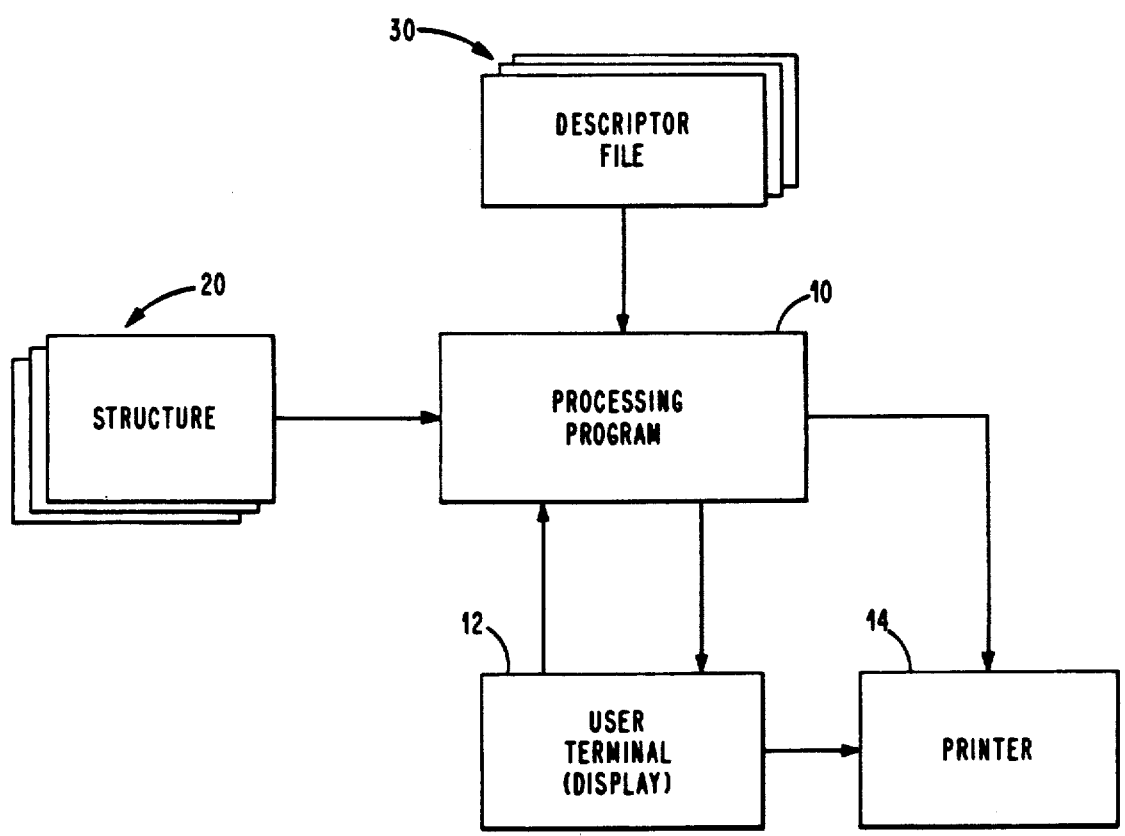
FIG. 1 is a general block diagram illustrating the broad concepts of the invention.
Figure 21:
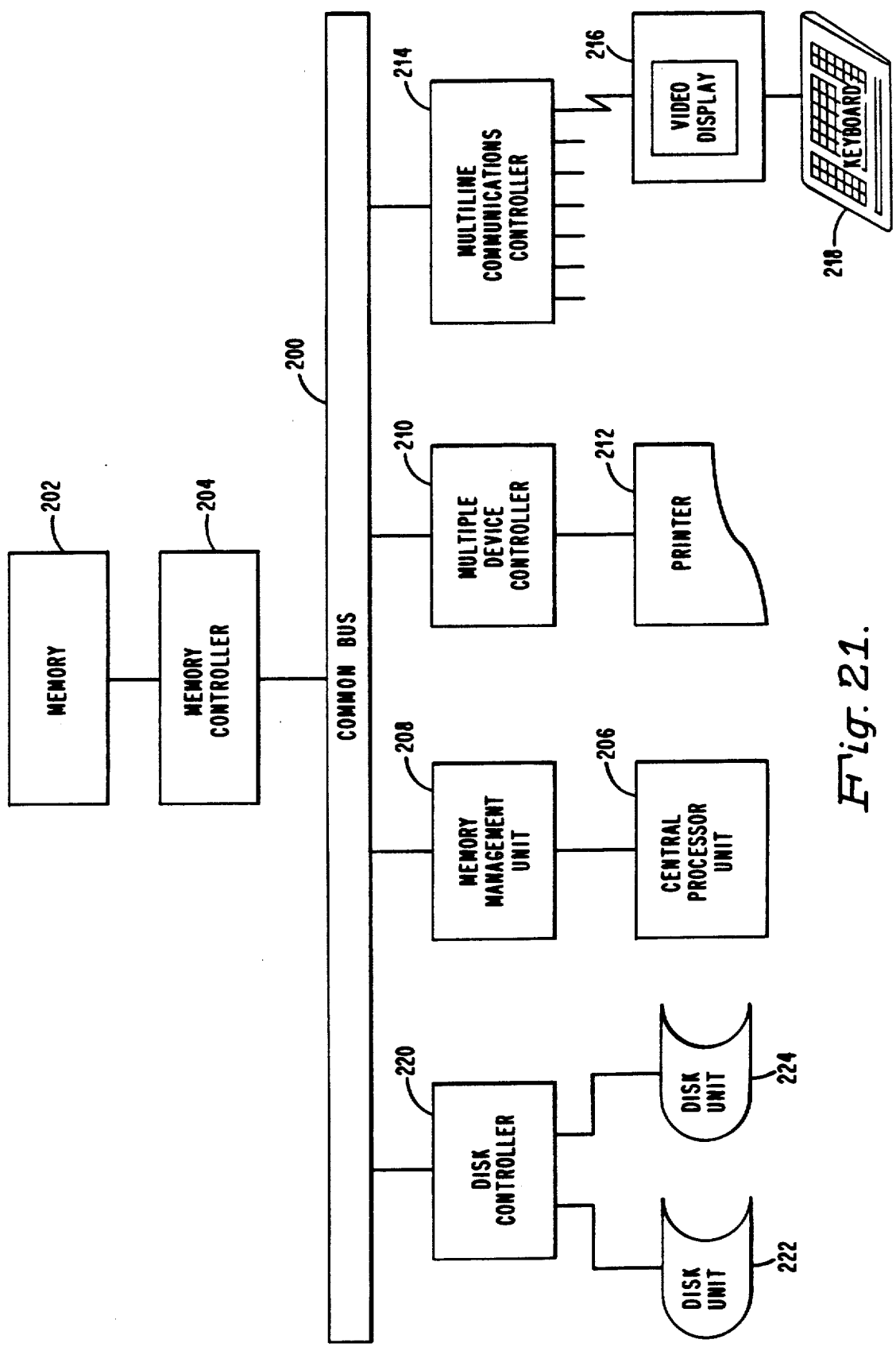
FIG. 21 is a hardware block diagram of a computer system with which the technique of the present invention may be practiced.
Figure 22:
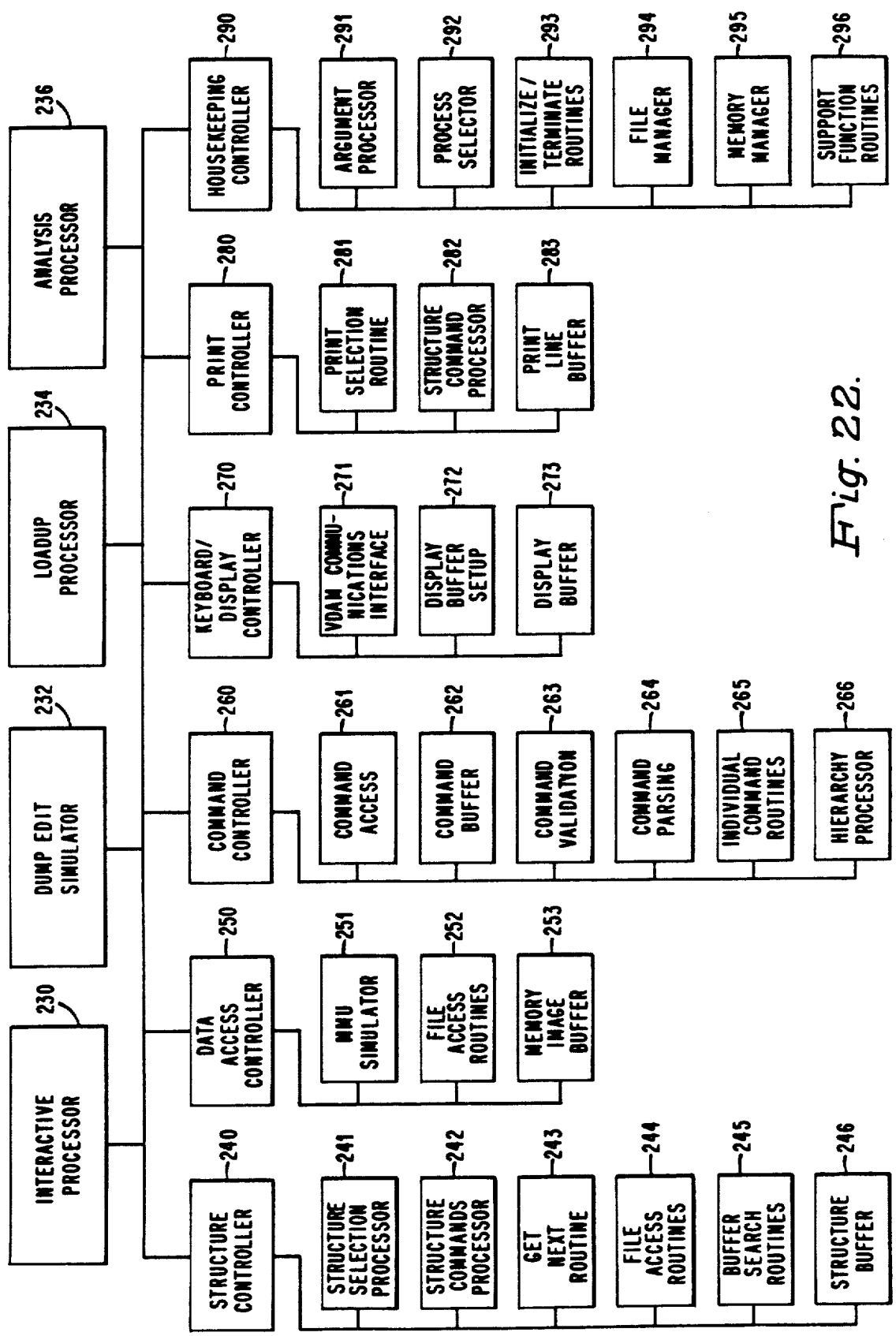
FIG. 22 is a block diagram illustrating the preferred processing program illustrated in the very general block diagram of FIG. 1.
Figure 23:
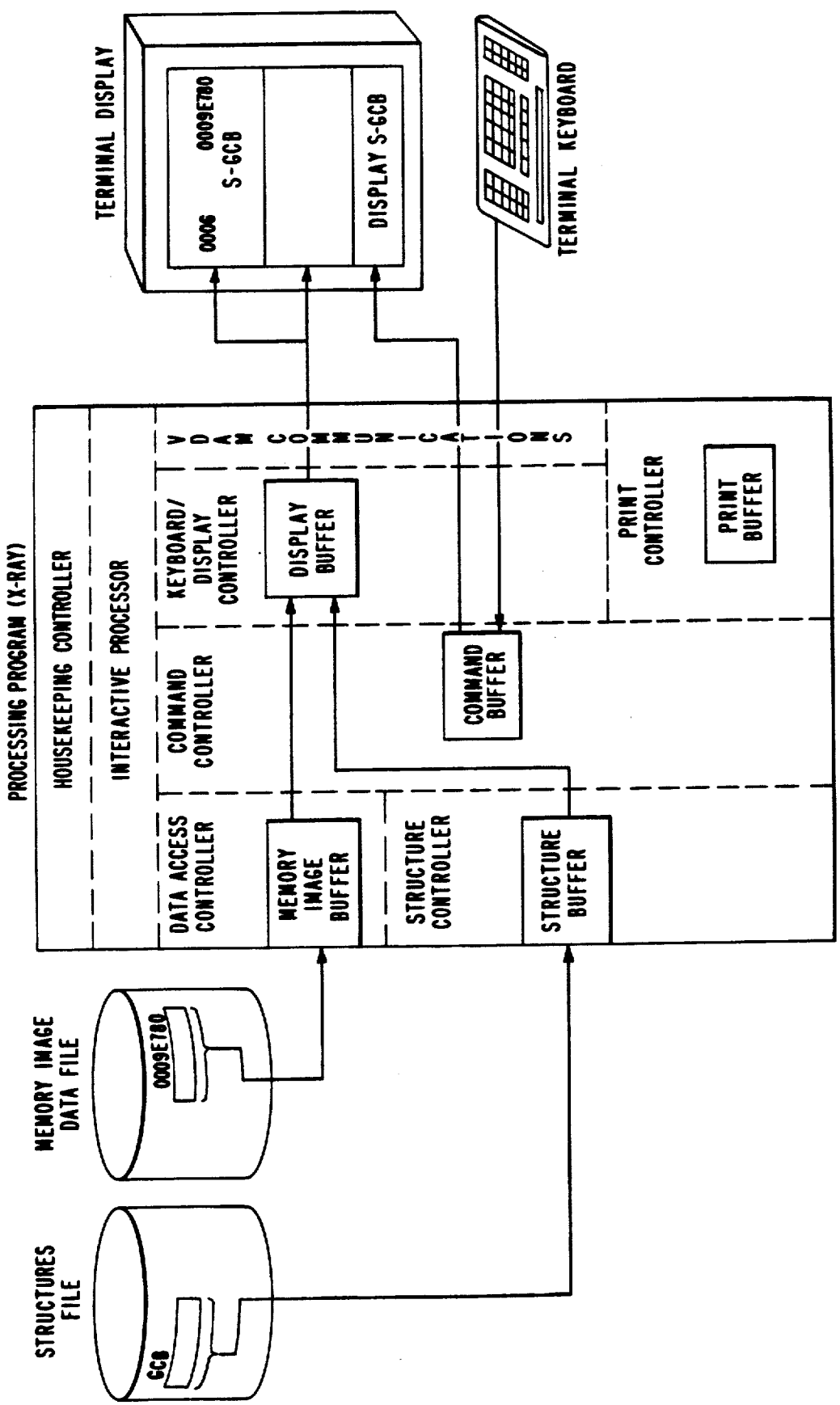
FIG. 23 is a block diagram useful in illustrating the control functions associated with the display of control structures.

In connection with the invention, reference is now made to FIG. 1 for a general block diagram illustration of the concepts thereof. Reference is also made to FIG. 21 which provides a more detailed hardware diagram. This diagram may be implemented by a computer system such as the Honeywell DPS 6 model 43. FIG. 22 also described in further detail hereinafter illustrates a high level block diagram of a preferred processing program. FIG. 23, also described in further detail hereinafter is a block diagram that is helpful in illustrating the particular operational functions carried out in association with the display of dump program data.

FIG. 1 shows the processing program 10 interfacing with a user terminal 12 and printer 14. The control structures are illustrated at 20 intercoupling with the processing program 10. These may be in the form of memory images of one or more operating systems. The processing program 10 communicates through a set of descriptors. These are illustrated in FIG. 1 y the structures file 30. The processing program 10 is driven by the information in the structures file so as to provide display of the control structure values. The descriptors themselves in the structures file 30 describe the control structure 20 that is to be displayed.

In accordance with the invention, when a change occurs to an operating system requiring any altering or adding to the control structures, the program itself need not be changed. Instead, changes occur to the structures file itself. Thus, there is provided a customized structure file that may be operated with a single processing program that allows a user to carry out problem analysis on different systems or different versions of the same system using the same command set. The command choices available to the user are thus independent of the kind of internal format of the memory entity (structures 20 in FIG. 1) being analyzed.

The structures file 30 contains descriptions of the control structures 20 that are used by a computer operating system and that normally define the content of information residing in fixed or variable locations in main memory. Generally speaking, the control structures of an operating system are small collections of related information pertaining to some feature of the operating system. Besides containing control information, most control structures include pointers to other iterations of the same structure and/or pointers to other interdependent structures. Normally, the set of control structures for an operating system can be viewed as a "tree of structures" with a common point from which all structures are accessible. In this regard, refer to the "tree of structures" illustrated in FIG. 2.

One structures file normally contains one set of control structure descriptors which apply to one version of one operating system. However, there may also be multiple sets of control structure descriptors as outlined in FIG. 1 covering multiple versions or multiple operating systems. The descriptor for any one control structure is comprised of a set of statements which define, inter alia, the type of data contained in a specific field of that control structure, the length of that data field, the offset from the beginning of the structure where the field commences, the name by which that field is referenced, and a brief definition of the purpose of the field. A control structure descriptor may, in addition to providing the field descriptive statements, contain statements that provide location access information, selection control tests and calculation statements. A full description of the structure descriptor statements follows. In this regard refer to FIGS. 15A-15F.

The structure file is a descriptor file which the processing program uses to interpret dumps or live memory of a computer system such as the Honeywell MOD 400 system. The structure file describes all system control structures, and it provides a means of obtaining formatted printouts of them. The structure file also provides information about the contents and interrelationships of the control structures. It allows testing and accumulation of the information as it examines the structures.

Figure 2:
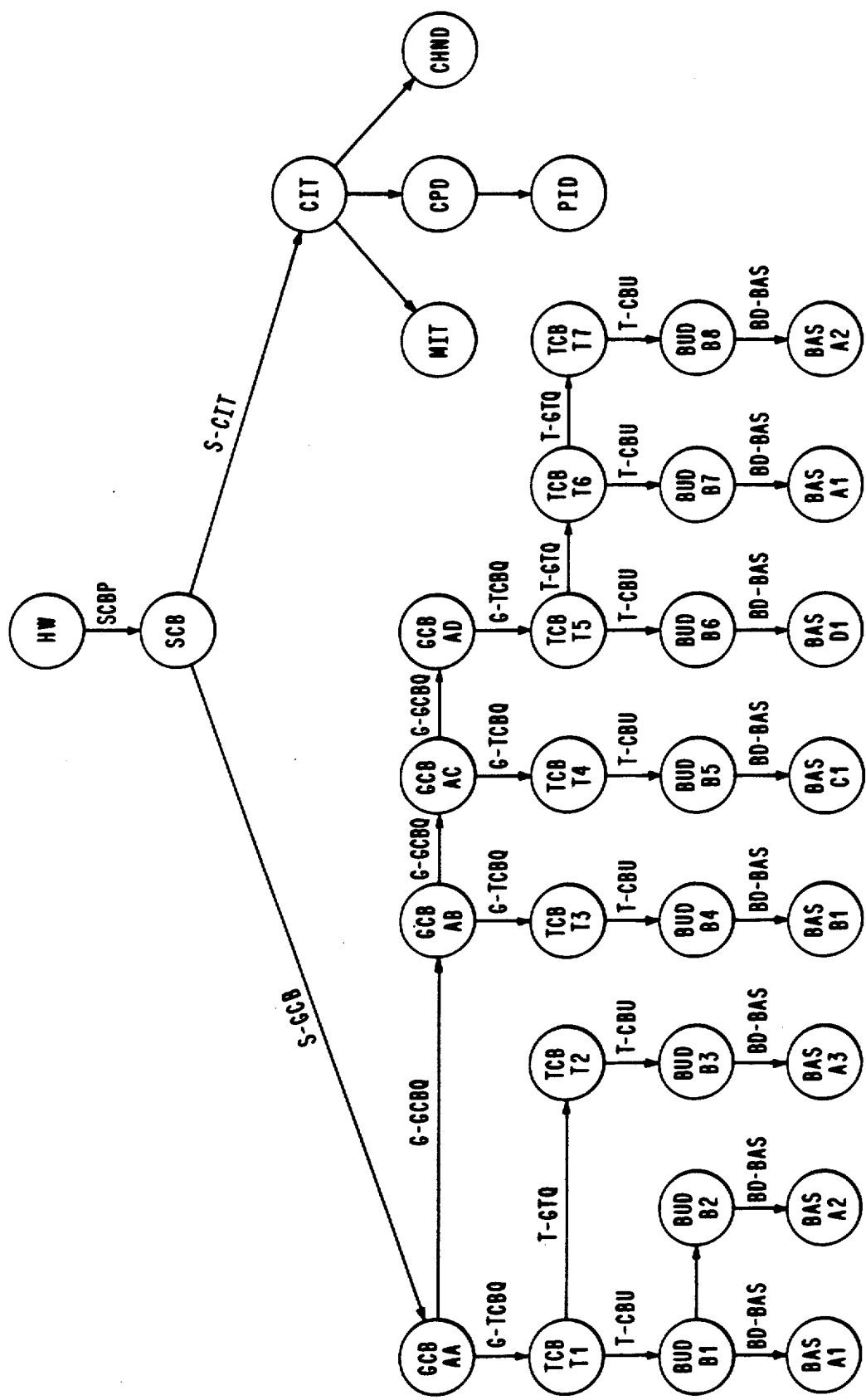
FIG. 2 is a diagram illustrating control structures for an operating system in the form of a tree of structures with a common point from which all structures are accessible.

A typical structures file is illustrated in FIG. 16. This schematic example of a structures file is one that actually is comprised of five separate structures identified in FIG. 16 as structures HW, SCB, SCB1, SCB2 and GCB. In this regard, also refer to similar definitions of the structures in FIG. 2 but also including structures BUD and BAS. It is noted in FIG. 16 that each of these structures starts with a hierarchy descriptor and then may include additional statements relating to this structure. For example, with regard to the structure HW there is a hierarchy descriptor followed by 15 more statements. The same also applies to the structures SCB and SCB1. Each control structure, such as structure TCB in FIG. 2 is described by a series of statements which serve to describe the contents of the structure and to also carry out certain processing thereof to assist in dump analysis. In all of the relationships between different structure is described in the structure file and is not built into the processing program.

The processing program requires that the structure file contain a record which describes the hardware base of the system Its key is HW in FIG. 16. The Honeywell MOD 400 hardware base contains a pointer to the System Control Block (SCB) which in turn leads to all other system structures. Again, refer to FIG. 2. These structures are described one by one in the structure file, with indexing by structure name.

In connection with FIGS. 2, 16 and 17, the following control structure designations are used:

| | |
|---|---|
| HW | Hardware |
| SCB | System Control Block |
| TCB | Task Control Block |
| GCB | Group Control Block |
| BUD | Bound Unit Descriptor |
| BAS | Bound Unit Attribute Section |

The definition of one specific control structure is comprised of a collection of statements. In the embodiment of the invention described herein each statement is 62 characters in length. The different types of statements will be referred to in sequence hereinafter. In all of these statements the first two character positions identify the type of information contained in the statement. All statements in which the first character is an alphabetic are statements defining a specific field of the control structure. The second character of these field defining statements may exist or not (space) as the need exists for further clarification. All statements in which the first character is a numeric are statements that provide criteria for selection, control or services. In the case of these statements, the second character always exists.

As indicated previously, each structure file statement is comprised of 62 characters. Statements can be in any sequence, however, the first one in every record is to be the hierarchy descriptor to identify the structure being described. Statements may extend to additional records as necessary to complete the description of the control structure. Each record contains statements about only one control structure with the first statement serving to link and identify records. A record is basically up to 16 total statements.

In connection with a control structure description, reference may now be made to FIG. 17 which shows a representative structure descriptor in the form of a series of statements. In this regard, note that the last statement is the field defining statement. This defines data fields of the structure. The statements above the field defining statements are all referred to as control defining statements. These statements provide criteria for selection, control and services. All of these statements have a numeric character in the first character position and a non-space in the second character position. The format of the remainder of each statement depends upon its purpose of use. In FIG. 17 note once again that the first statement is the hierarchy descriptor statement which names the particular structure/record.

Before reviewing in detail the various statements, brief reference is made to the processing program that is controlled by the structures file descriptors to provide display of the control structure values. There is now briefly described some aspects of the program. However, reference is made to further details such as depicted in FIG. 22 to be described in further detail hereinafter. Also set forth hereinafter are the dump program commands. In this connection the interactive dump editor or program shall be referred to hereinafter as XRAY.

The program presents to the user memory image information generally from one of two sources. The information is either from live memory of the current session or a dump file which results from a prior memory dump execution. The purpose of the program is to provide a tool with which the system and user memory resident structures, code and data can be viewed for reasons of analysis and debugging. Basic to this program is the reduction or elimination of printing by allowing the user to view any available information, interactively, using uncomplicated commands and providing versatility in the display of the information.

In connection with the program, two of many functions performed thereby include the Display and Print Control and the Structures Access Control. The Display and Print Control creates display information for the user terminal under selected format control using information from the Structures Access Control and from Data Access Control. The Structures Access Control reads requested structure descriptors from the structures file.

The basic program operation may be considered as follows. The user calls the program. Then, if not supplied along with the call to the program, the user may interactively provide the path names for the dump file, and any associated files, the print file, and the command file, and structures file, if these are to be used. The program uses default names where necessary for those not supplied by the user. The program next attempts to make an analysis (if dealing with a dump file) of generic or specific problems that are known to sometimes occur. This analysis should provide the user with the basis for further investigations through the interactive commands. The program is next ready to start processing commands. Those commands can come generally from one of two sources; from the users terminal or from a command file (if one is specified). Commands from a command file are processed first and if the command to "quit" is not included in that file then commands are expected from the users terminal when the command file is exhausted. The commands ar initiated by entry of specific commands or function keys. If some of the commands require additional clarification not yet supplied, that information is requested interactively. Commands from a command file must have the clarifications included within the command.

Commands generally have two classifications, micro and macro. Micro commands have simple function purpose and either access information or control its display. Macro commands provide access to and printing of a collection of information. The program, in its execution of those commands, is able to look into the whole body of system/user information by progressing along the skeletal framework provided by the systems structures. This method of progression along queues and following pointers from one structure to another, permits the user to peruse the memory or dump file in an analytical manner consistent with methods used if working with a hard copy dump. The user is able to hold references to specific displays for easy re-accessing and has two display zones on the screen for simultaneous referencing or comparing. The interactive commands of the program are relatively limited in number and yet have a broad scope to which they can be applied. The information acquired in this interactive perusal is presented in one of three selectable formats on the users terminal (display) and optionally on a print file. Note the terminal 12 in FIG. 1 and the printer 14. The three formats are:

1. the raw display of memory image for that structure
2. packed display showing offset, field name, and data
3. full display showing offset, field identification, data, and field description.

The specialized system control structures necessary to control the operation of the program and to display information are maintained in a special system file. As indicated previously, changes to systems structures made necessary by changes in future software releases only require updating of this file. Note the descriptor file 30 in FIG. 1. Reference will be made hereinafter to other aspects of the programming.

With regard to the different formats of display that can be called upon by the user, reference is now made to FIGS. 18-20. FIG. 18 illustrates a full display including columns for offset, field identification, data and field description. In FIG. 18 a particular structure name selected is the structure GCB. In FIG. 18 column A gives the offset of each field in the structure. Column B identifies the name of each statement. Column C provides the memory data. Column D gives a description for each field.

FIG. 19 is illustrative of a display of the structure file itself without memory. Thus, in FIG. 19, column A gives the offset. Column B provides the field name or identification. Column C provides the field description.

Also capable of being displayed is a raw display of memory image for that structure. This raw display of a main memory dump is illustrated in FIG. 20 by way of one illustrative example.

As indicated previously, there are basically two different types of statements; a field defining statement and control statements. For the field defining statements refer to the format of FIG. 15A. This diagram illustrates the 62 character format and furthermore illustrates the different segments of the statement. In connection with the field defining statement of FIG. 15A the following correlates character segments with their associated definitions:

Characters 1-2: characters defining TYPE of data contained in the field.

Characters 3-6: offset from start of control structure where field exists.

Characters 7-14: name by which field is commonly referenced.

Characters 15-20: name of structure this field points to if it does point to a structure.

Characters 21-24: mask or utility information.

Characters 25-31: (reserved)

Characters 32-62: description of purpose of field.

These field defining statements are used primarily by Display and Print Control to locate data in memory and provide the verbage to attach meaning to the displayed and/or printed data.

In the statement of FIG. 15A, the length of the field is determined through implication based on the type specification of the first characters, or by the value supplied by the second character, or, in the case that the field contains alphanumeric data (first character ="C") by a value in character positions 21-24.

When the field being defined is less than the total content of one addressable memory location, the mask (characters 21-24) selects the valid bits comprising that field.

An example of the utility of these field defining statements may be illustrated by the manner in which the processing program uses them. In this regard, refer to hierarchical diagram of control structures in FIG. 2.

If the user desires to display the structure GCB in FIG. 2 then the structure description named SCB is accessed in the structures file. It is known in connection with this access where the associated data exists in memory. The user desires to see a display of all fields of an immediately subordinate structure, namely, structure GCB which is pointed to by a field in the SCB structure named S—GCB.

Figure 3:
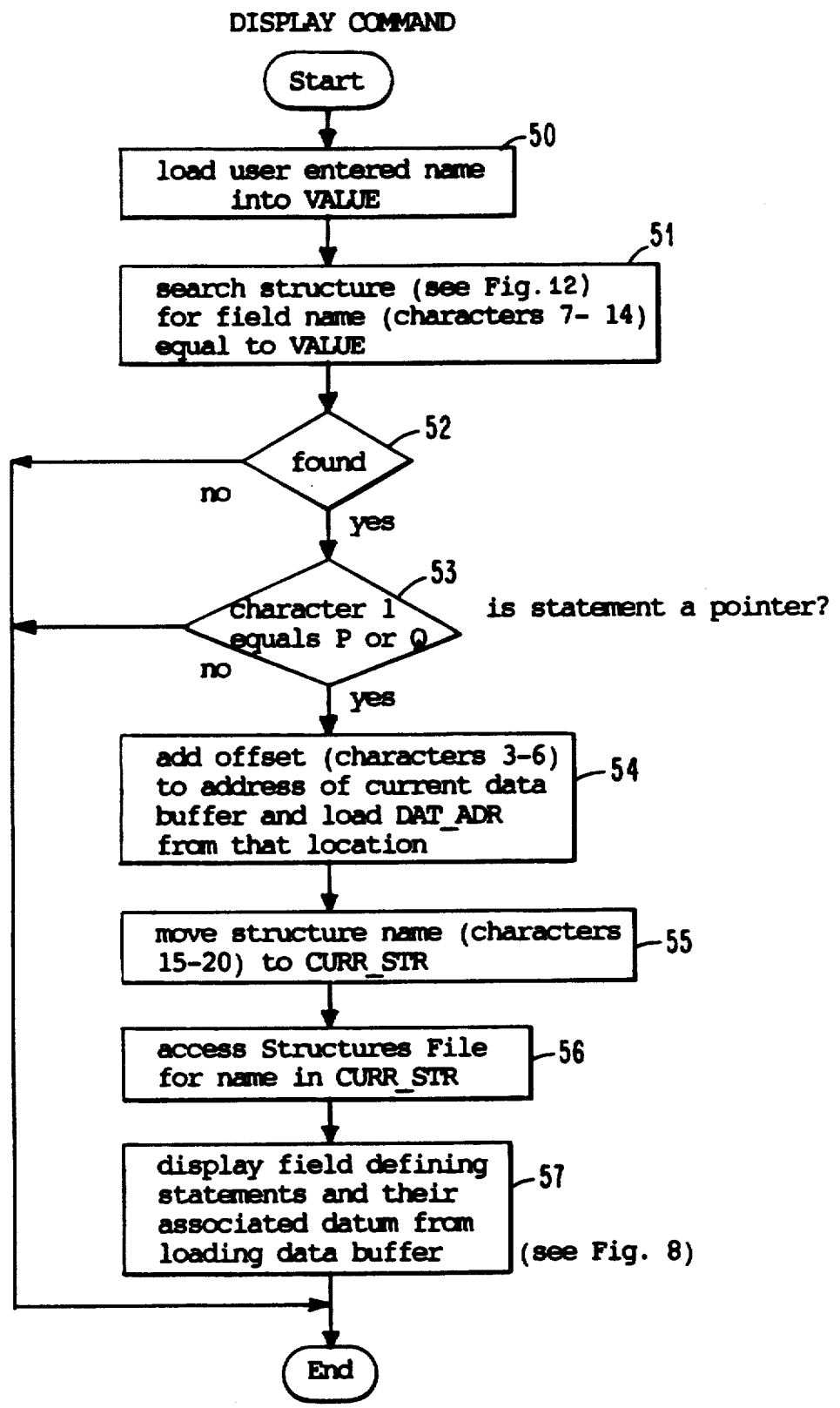
FIG. 3 is a flow chart of the DISPLAY command.
Figure 8:
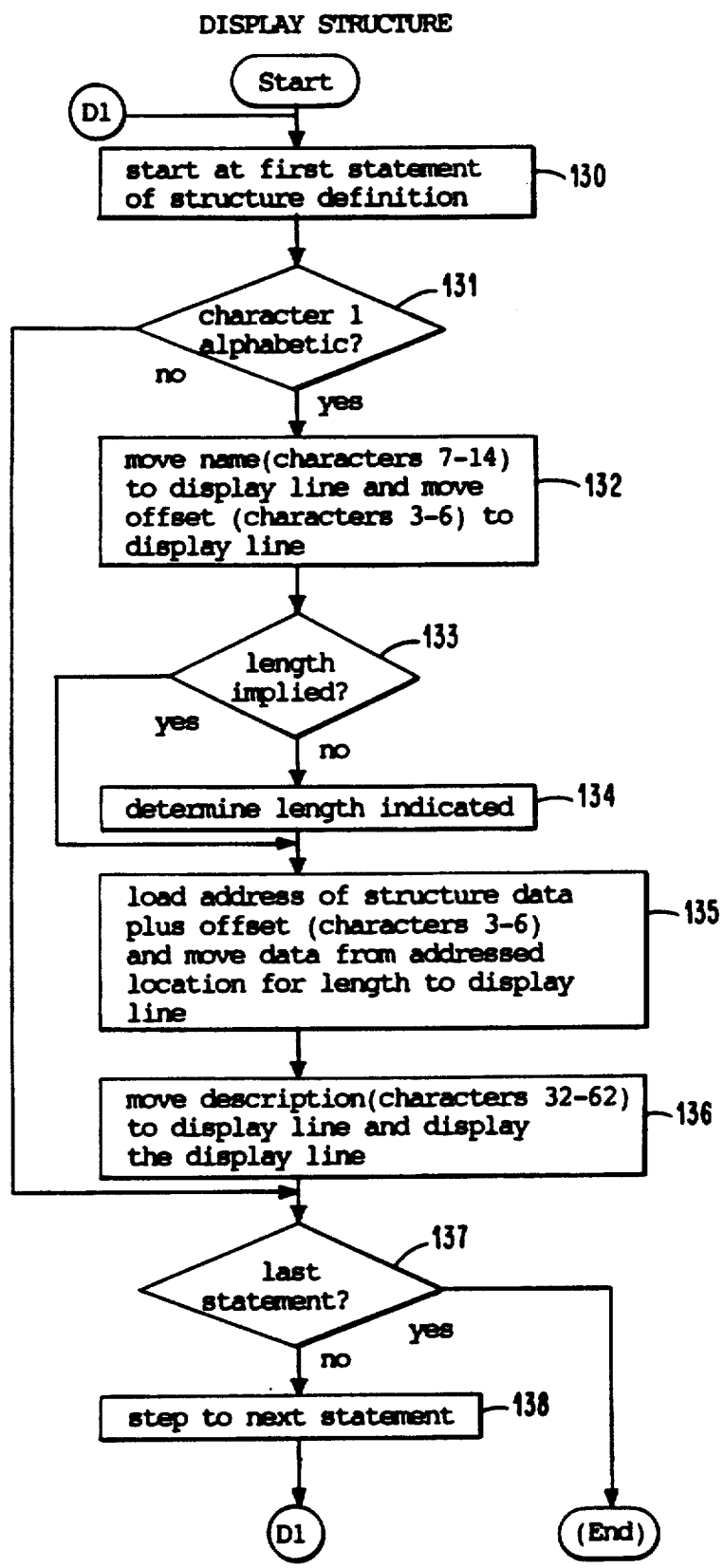
FIG. 8 is a flow chart of the DISPLAY function.

In accordance with program control, when the structure description named SCB is accessed the display shows each field name, its offset within the structure, the data content found in the associated area of memory and the description of the purpose of the field. The user knows that field S—GCB points to the GCB structure and therefore enters the command DISPLAY S—GCB. Refer to FIG. 3 and step 50. The display command which is illustrated in the flow chart of FIG. 3 causes the current structure, SCB to be searched for a name (characters 7-14) which equals S—GCB. Refer to step 51 in FIG. 3. If the statement is found by step 52, then one moves to step 53. IN step 53 if the statement name S—GCB identifies a "pointer" type statement (character 1=P or Q), the offset (characters 3-6) is used to access SCB's associated data to obtain the pointer to the data area associated with the pointed-to structure. Refer to step 54 in FIG. 3. Then the structure identifier (characters 15-20) is used to access the most current structure, GCB in this instance, in the structures file. Refer to steps 55 and 56 in FIG. 3. With the identity of the new current structure, GCB, and the identity of where its associated data resides (the pointer from the S—GCB field of the former current structure), the display command now proceeds to set up and display the prescribed information from each of the GCB's field defining statements and from the associated data area in memory. Refer to step 57 which also references the display sequences of FIG. 8. In connection with FIG. 8 refer to the set forth steps 130-138.

As previously noted in connection with FIG. 16, the first statement identifies the name of the structure. This first statement will always be a name identifying statement. This statement has 0 0 followed by the name of the structure. The format thereof as illustrated in FIG. 15B is as follows:

The first two characters signify the structure or record identifier.

Characters 3–8 contain the name of the structure. Characters 9–14 contain the name of the next structure if the total structure cannot be contained in one record.

The named structure/record is loaded into memory immediately following this one. A blank in this position indicates that this is the last structure/record. Characters 15–62 are usually blank. This statement serves to identify the beginning of a specific structure in the structures file.

By way of example, suppose that the particular statement is as follows:

---

00TCB . . . TCB1 . .
00 = specifies the STRUCTURE/RECORD IDENTIFIER
TCB . . . = indicates this structure type is a TASK CONTROL BLOCK
TCB1 . . = indicates another STRUCTURE/RECORD named
TCB1 must be loaded to help complete this structure definition.

---

Another control type of statement is the hierarchical description statement which serves to describe how to reach the structure in which the statement exists from a known fixed location structure. This hierarchical description statement is identified by the type code 01. This code is representative of the first and second character positions. The structure name and field name sets exist in order from the fixed location structure to the structure immediately superior to the structure in which the statement exists. The sets are separated by commas and a full hierarchical description is terminated by a semicolon. The full hierarchical description may extend over several of these statements. A set contains the name of a structure followed by an underscore character (_) which in turn is followed by the name of a field in that structure which points to the next in the hierarchy of structures. The format of these statements is as illustrated in general in FIG. 15C.

An example of the utility of these hierarchical statements may be shown by examining how they are used by the processing program. If the user of the program wishes to examine a structure such as the BAS structure (refer to FIG. 2) and, in particular, the one that has an identifier field descriptor statement (characters 1-2 =ID) that defines a field in the structure containing the value Cl; entering the command LOCATE BAS [=Cl] accomplishes this through the use of the hierarchical statement in the BAS structure description.

Figure 4:
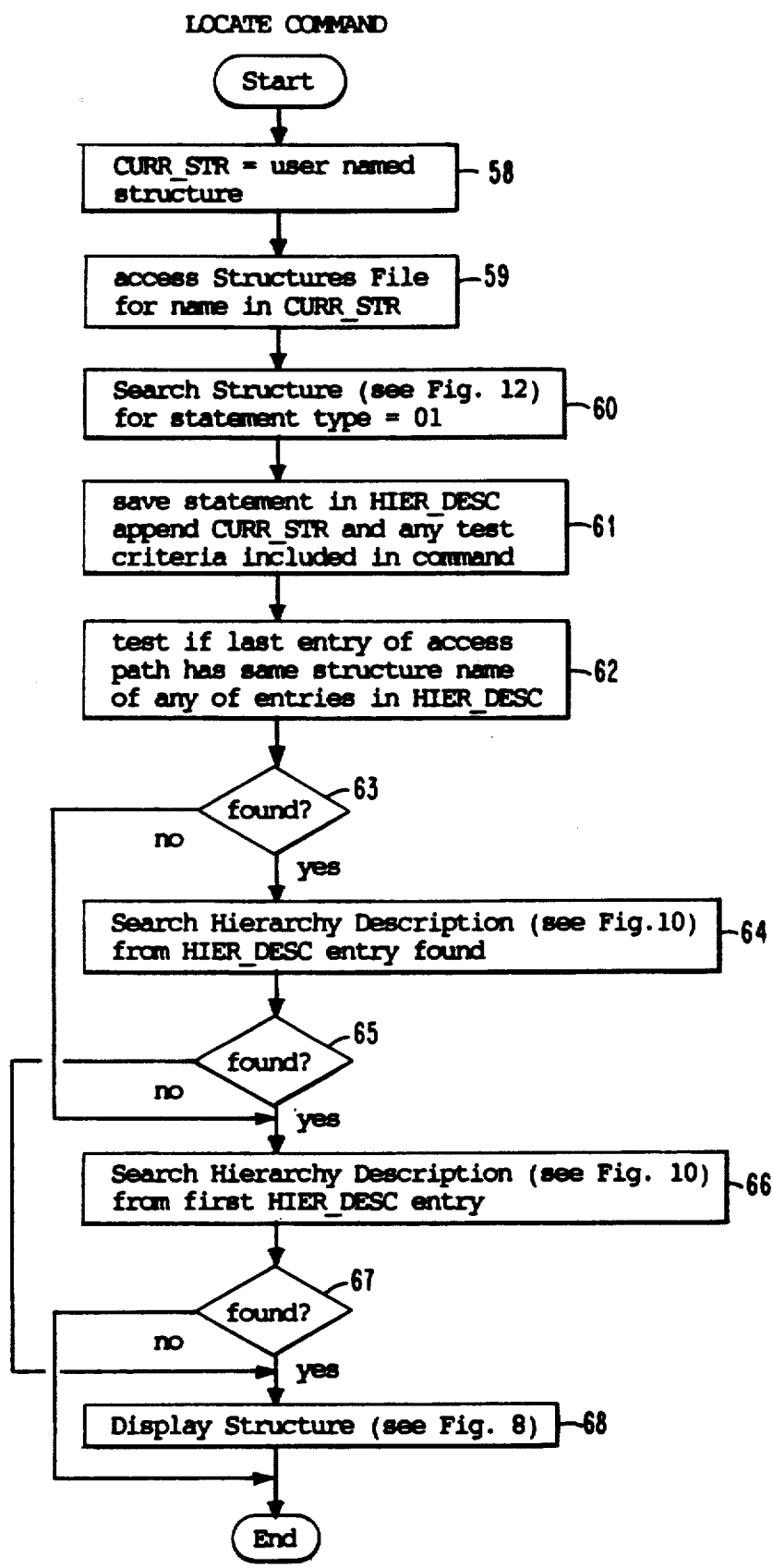
FIG. 4 is a flow chart of the LOCATE command.

Reference is now made to FIG. 2 in which the hierarchical description statement for a BAS structure is stated as follows:

01HW_SCBP, SCB_S_GCB, GCB_G_TCBQ,
TCB_T_CBU, BUD_BD_BAS;

Reference is now made to the flow chart of FIG. 4 for the locate command associated with the processing program. The logic of this locate command proceeds as follows. The BAS structure in the structures file is accessed (steps 58 and 59) and a statement-type (characters 1-2) of 01 is searched for and saved (step 60) for reference by the hierarchical search logic. This logic then walks through the structures and associated data until a requested structure is found or all possibilities are exhausted. If found, the structure is then displayed.

Figure 10A:
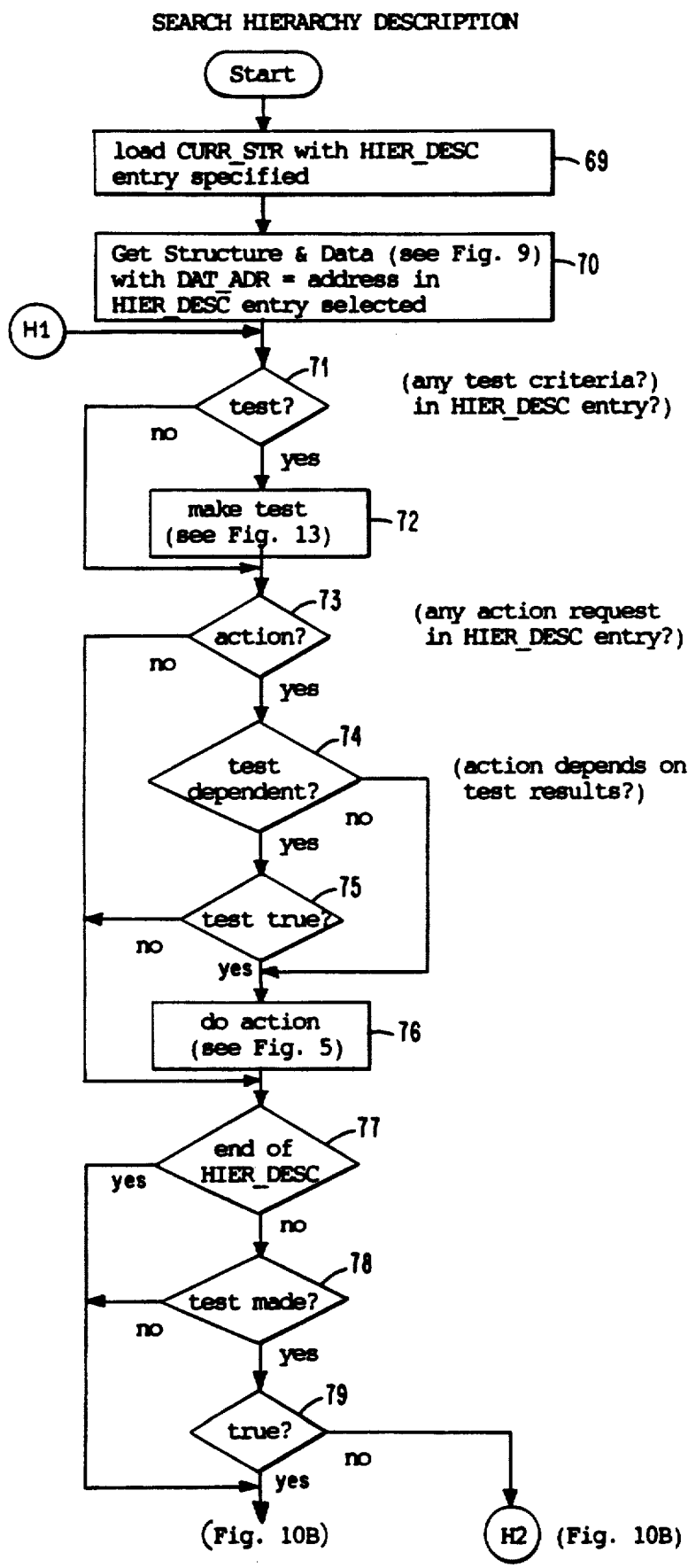
FIG. 10A is a flow chart of the SEARCH HIERARCHY DESCRIPTION function.

To accomplish the command LOCATE BAS [=Cl] in reference to FIG. 2 the locate command (FIG. 4) accesses the named structure (BAS) in the structures file, searches that structure for the statement(s) with 01 in the first and second character positions, saves the statement(s) found in a character array named hier-desc (step 61), and appends the structure name and any test conditions (step 62) stated in the command ([=Cl] in this case). Next, the program goes to the search hierarchy description logic (FIG. 10) and upon return displays the searched-for structure or displays a message that the structure is not located depending upon the success of the search. In this regard, refer to steps 63–65 and also steps 66 and 67 in FIG. 4.

Figure 5:
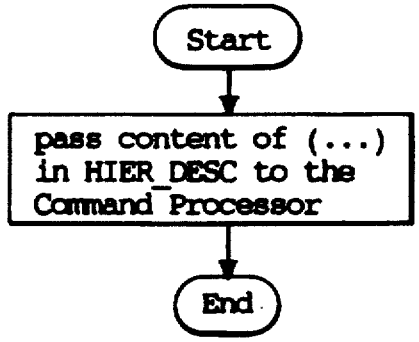
FIG. 5 is a flow chart of the HIER-DESC ACTION.
Figure 9:
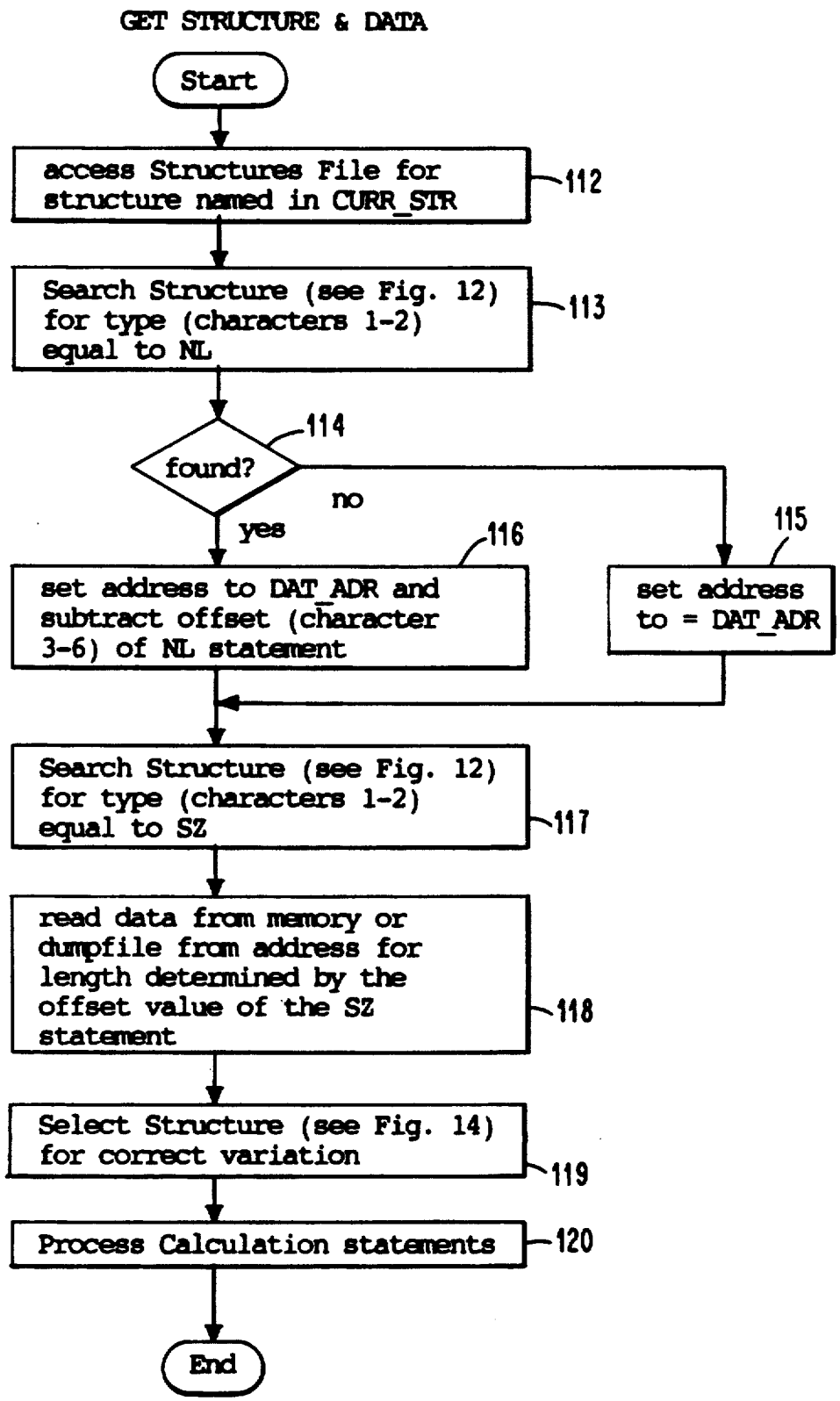
FIG. 9 is a flow chart of the GET STRUCTURE AND DATA function.

The hierarchy description search logic (FIG. 10A), when called, is what uses the 01 type statement that exists in the set statements describing a particular structure. It uses that statement information, which now resides in hier_desc (see FIG. 5), by selecting the first entry in hier_desc and using the structure name therein identified along with the known memory location of where the structure resides to access the structure description (step 69 in FIG. 10A) from the structures file and the associated data from memory or a dump file. This is done by Get Structure & Data logic (step 70 in FIG. 9). A test is then made (steps 71 and 72) to see if the correct entry in hier desc has test criteria to consider before doing some action or proceeding to the subsequent entry in hier_desc. In our example, the only test criteria comes in the final hier_desc entry (i.e., [=Cl]). Next, a test is made to see if the current hier_desc entry requests an action take place. This could be the request to print out the current structure, for example. Our example has no action requests, so this can be ignored and we proceed to page FIG. 10B. Steps 70–79 in FIG. 10A describe the logic of the aforementioned tests.

Figure 7:
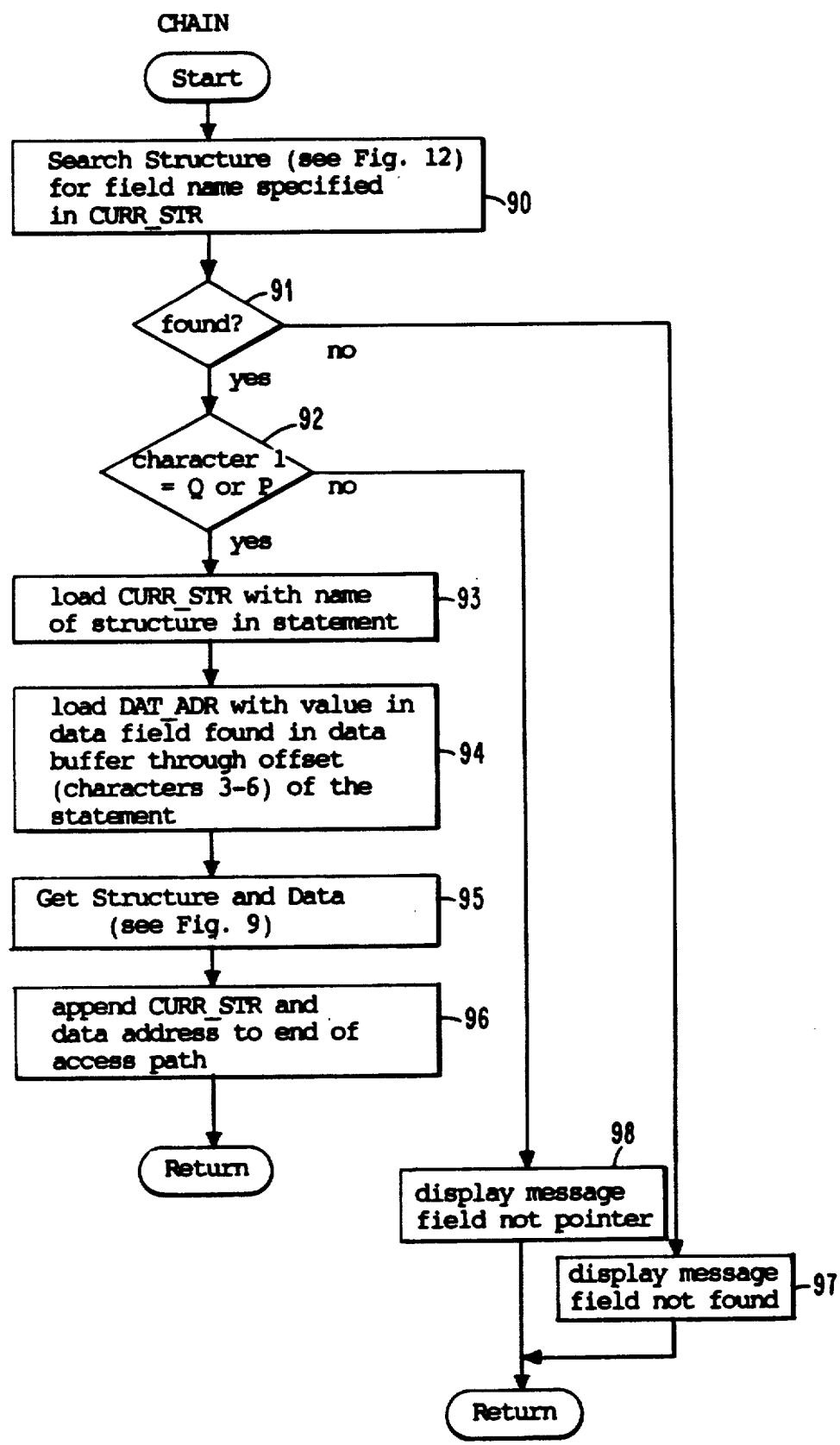
FIG. 7 is a flow chart of the CHAIN function.
Figure 10B:
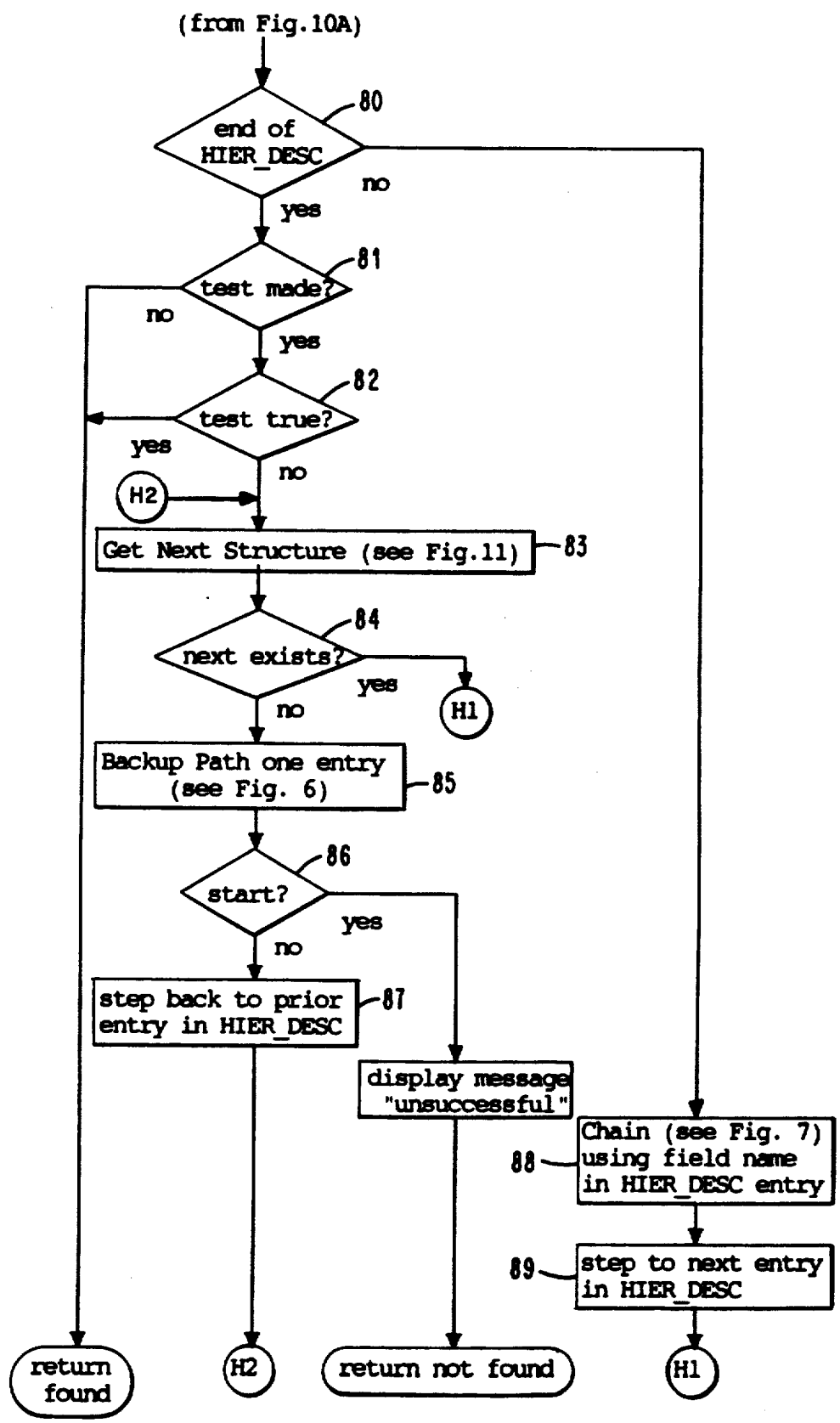
FIG. 10B is a flow chart of the SEARCH HIERARCHY DESCRIPTOR function.

Now, one checks to see if the current hier_desc entry is also the last entry in hier_desc. In this regard refer to FIG. 10B and step 80. It is not in this case, so one uses the field name in the current hier_desc entry and calls Chain (step 88 and reference to FIG. 7) which will search the current structure for the field named (refer to step 90 in FIG. 7), verify that the statement found is a pointer type statement (character 1=P or Q) (refer to steps 91 and 92 in FIG. 7), loads a character array, curr_str, with the structure name found in characters 15–20 of that statement (refer to step 93 in FIG. 7), loads a pointer named data_adr with the data found in the current data area through use of the offset (characters 3–6) of that statement (refer to step 94 of FIG. 7) and then calls Get Structure & Data (step 95 and FIG. 9) which uses curr str and dat_adr (step 96 in FIG. 7) to make the new structure and its associated data current. Lastly, Chain appends curr str and dat_adr to the access path (acc_pth) array and returns to the Search Hierarchy Description (FIG. 10). Step 97 relates to the display message chain field not found while step 98 relates to the display message invalid field for the chain.

Figure 11:
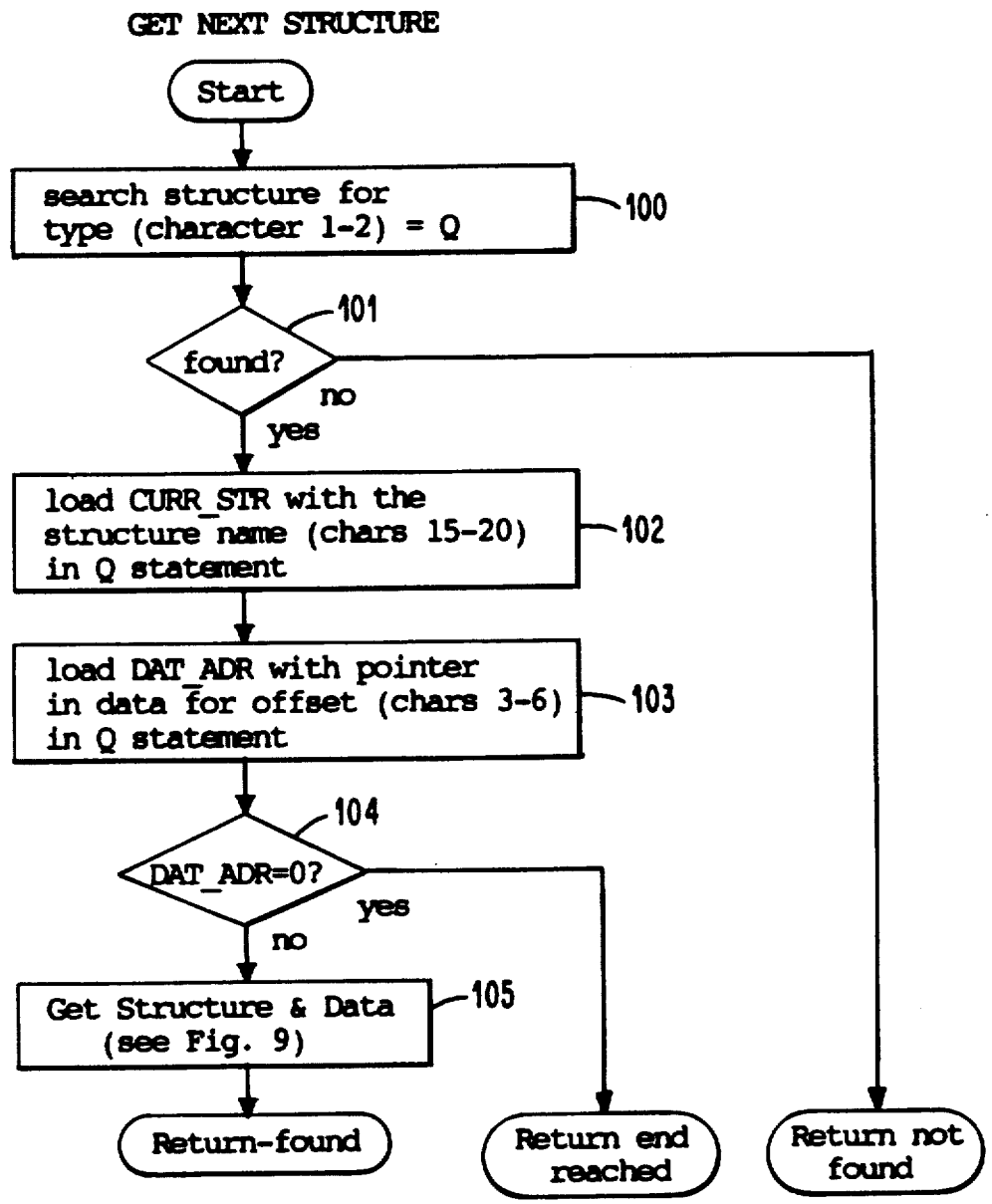
FIG. 11 is a flow chart of the GET NEXT STRUCTURE function.
Figure 12:
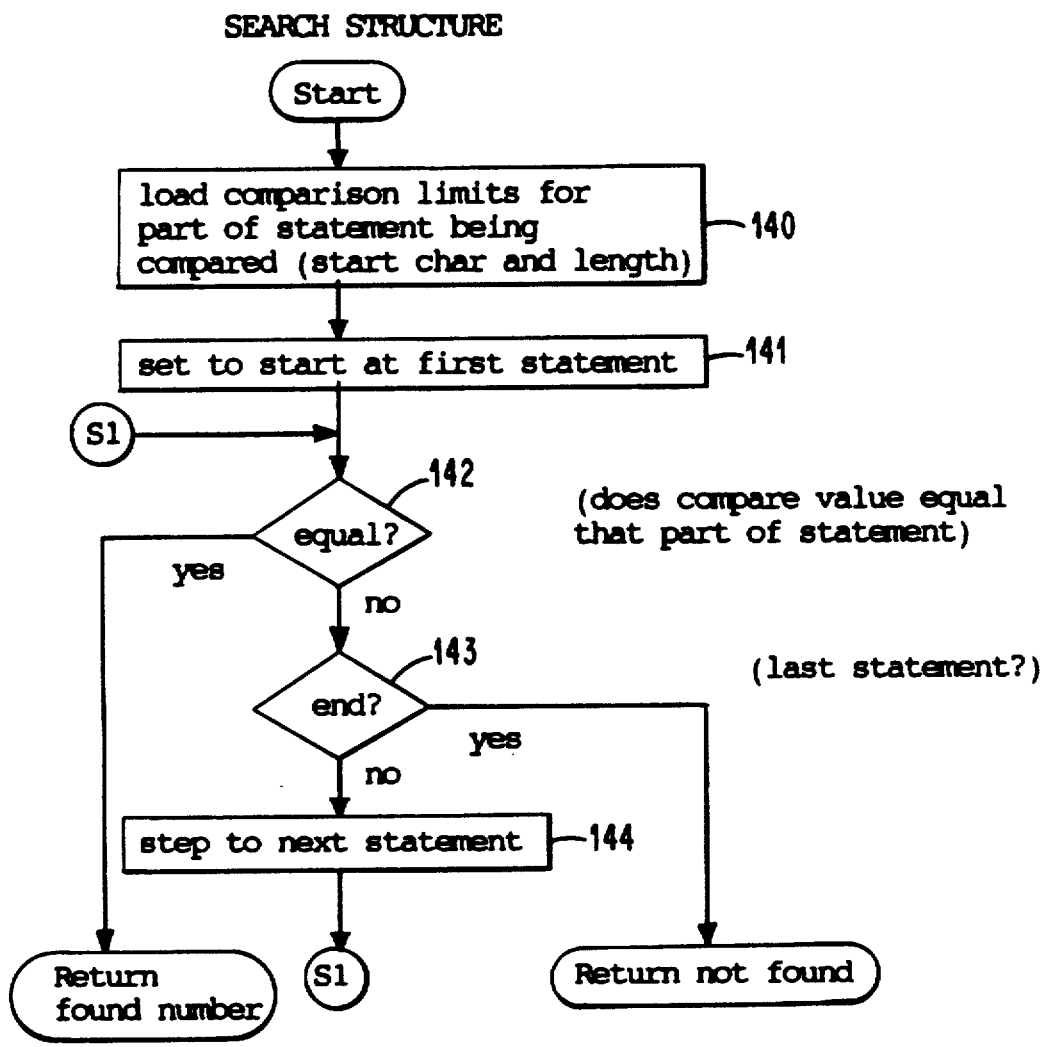
FIG. 12 is a flow chart of the SEARCH STRUCTURE function.
Figure 13:
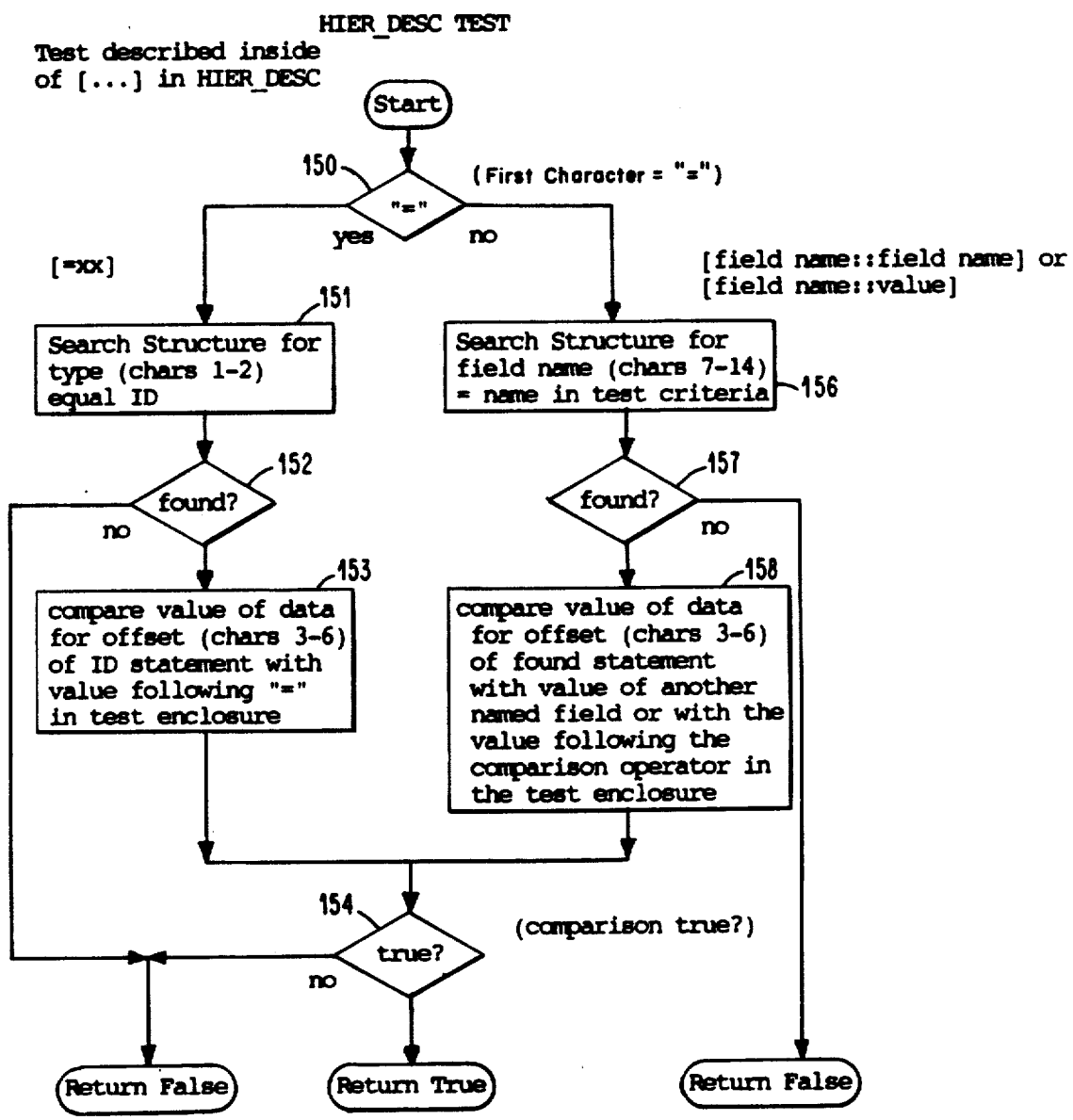
FIG. 13 is a flow chart of the HIER-DESC TEST function.

At this point the Search Hierarchy Description steps to the next entry in hier_desc and loops back to point H1 (FIG. 10A) to check if there is any test criteria or action to do or if this is the last entry in hier_desc. Obviously, it will stay in this loop until the last entry in hier_desc is reached and in the process will have "chained" down from the HW structure through the SCB, the GCB, the TCB and the BUD until it now has the BAS (identified as Al) (see FIG. 2) as the current structure and its associated data area located. Since this last entry in hier_desc (step 77 in FIG. 10A) does have a test criteria, [=Cl], (which came from the command) it will make the test (see FIG. 13)(Refer in FIG. 13 to steps 150-158). The test will conclude that this BAS identified as Al is not equal to Cl. After making the test, the Search Hierarchy Descriptor will determine that the last entry in hier_desc (step 80 in FIG. 10B) has been reached (FIG. 10B). It then determines that, if a test was made, was the test true or not. Refer to steps 81 and 82 in FIG. 10B. If it were true, control would be returned to the Locate logic with a "found" indication. In this instance, the test was not true therefore, Search Hierarchy calls Get Next Structure (step 83 and reference to FIG. 11).

Figure 6:
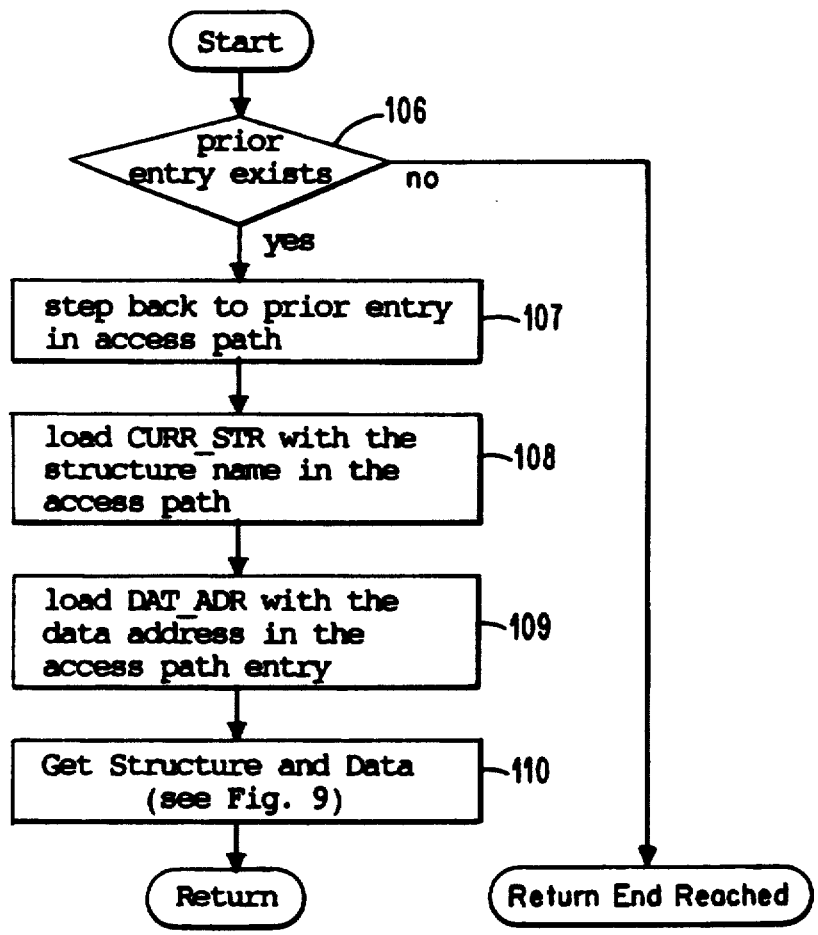
FIG. 6 is a flow chart of the BACK-UP function.

Get Next Structure (FIG. 11) determines if the current structure (BAS) has a queue pointer, a statement whose first character is a Q (see step 100 in FIG. 11), and if so, the associated data field contains a valid pointer to another in a queue of like structures. In this case, the structure BAS does not have a Q type statement and Get Next Structure returns an indication that a "next" does not exist. Therefore, Search Hierarchy calls Backup (see FIG. 6 and steps 106-110) which backs up the access path to the previous entry and calls Get Structure & Data with the curr_str and dat_adr information from that entry to make the previous structure and data current. In this case, the structure BUD. After the return from Backup, the hier_desc is stepped back its previous entry, now no longer the last. At this point (see FIG. 10B), control is looped back to H2 where one now calls Get_next for the BUD structure. Here, Get Next Structure does find a Q type statement and it is valid. Get Next Structure indicates on return that "next" exists and control is now looped back to H1 (see FIG. 10A)(also refer to steps 83 and 84 in FIG. 10B and looping back to step 71 in FIG. 10A).

At H1 one is now looking at the next BUD structure (82) in the queue, one finds no test criteria or action in the current hier_desc and therefore chains to the BAS (A2), step to the next entry in the hier_desc and loops back to H1. Now one does find test criteria in this the last hier_desc entry and makes the test. Again, the test is not true, as we are in the last entry of hier_desc so Get Next Structure (steps 80-83 in FIG. 10B) for BAS (A2) is called. It has no Q type statement, Backup is called to backup in acc_oth and the hier_desc is backed up one entry and control loops back to H2. At H2 Get Next Structure is called for BUD (B2) structure. Get Next Structure finds a Q type statement but it does not have a valid pointer (the end of the queue of BUD structures is reached). Therefore, it returns an indication that "next" does not exist and Backup is again called which now makes TCB (T1) the current structure and data. The loop back through H2 to do Get Next Structure causes TCB (T2) and its subordinate structures to be chained and tested. Eventually, the Get Next Structure and Backup loop (H2) and the test loop (H1) progresses through all the structures subordinate to GCB (AA), GCB (AB) and GCB (AC) until the BAS (Cl) is located. At that point the test is found to be true and the current entry of hier_desc is the last entry. Search Hierarchy Description returns control to Locate indicating a successful search. Locate then displays that structure. Note that if the command LOCATE BAS [=XX] had been given, the looping through H2 and H1 would have eventually backed up to structure HW and the start of access path at which point the message "Locate unsuccessful" would have been displayed and the return to Locate from Search Hierarchy would have indicated that the structure was not located.

Note also that if the intermediate entries of the hierarchical descriptor have test criteria those tests would be satisfied in the H2 loop of Get Next Structure and Backup before Chaining below the structure with the test criteria. For example, if the command LOCATE BAS [=Al]was used and the BAS structure had the statement:

```
01HW_SCBP, SCB_S_GCB,
   GCB_G_TCBQ[=AD], TCB_T_CBU,
   BUD_BD_BAS;
```

One can see that it would Chain down to GCB (AA) then because that current entry in hier_desc (GCB_G-TCB [=AD]) has a test criteria. Because it s not the last hier_desc entry and the test was made but not true go to H2 to find there is a next, go to H1 repeat the test on GCB (AB) continuing until GCB (AD) is reached and the test being true proceed chaining down the subordinate structures using the H1 and H2 loops to locate BAS (Al). IN this case, BAS (Al) subordinate to GCB (AA) is not seen.

Note also in the Locate Command (FIG. 4) that if a previous locate command is successful, the current entry of the access path (acc_pth) contains the currently displayed structures name and data location. If another locate command is given and the current structure is one of the intermediate structures of the hier_desc for the new structure to be located, then the Search Hierarchy Description (FIG. 10) begins from the entry with the same structure name as the current structure. This allows the command LOCATE GCB [=AD]to be followed by the command LOCATE BAS [=Al]and would accomplish the same thing the previous example demonstrated without having test criteria in an intermediate entry of the 01 statement. If the command LOCATE GCB [=AD]is followed by LOCATE BAS [=Cl], the attempt to locate BAS [=Cl] on the call to Search Hierarchy from a specific entry of hier_desc fails, but a subsequent call to search from the first entry is done.

Another of the Control type of statements are the Selection statements identified by the type characters (positions 1-2) containing the characters 30-99. The statements containing 30-99 in the first two character positions contain test descriptions; one test per statement. These test statements permit evaluation of data to permit selection of the correct version of a class of structure. This satisfies the situation in which a structure is being selected and it is known to be of a particular class, but could be any one of several sub-classes The selection test statements identify the test(s) that is to be made and the alternate structure to be used if a particular set of test statements all prove true. The format of the selection statement is illustrated in FIG. 15D.

Characters 1-2 contain 30-99 which identify that this is a selection test statement. If more than one statement is required to describe all of the tests necessary to complete the determination of the appropriate structure to be used, characters 1-2 are the same in all statements making up the set of tests.

Characters 7-14 contain the name of the field in the structure which is being tested. Characters 3-6 contain the offset, into the field named, of the data being tested. Characters 21-24 contain the value being tested against the data. Character 25 has in it the symbol of the test condition (e.g. the equal sign (=) requires a comparison for equality). Characters 26-31 contain the name of the structure to be selected if the test condition(s) are true.

An example of how these statements are used by the program is shown by referring to Get Structure & Data (FIG. 9) which shows that when that function is used, it makes a call to the Select Structure Variation function (FIG. 14)(Refer in FIG. 14 to steps 160-172). There, the structure is pursued for Selection Statements and if found, the described tests are made. If the set of Selection Statements produce true results, the named structure (characters 26-31) is then selected to interpret the associated data area. In connection with FIG. 9 refer to the successive of steps 112-120 also refer to FIG. 14 steps 160-172.

Another of the Control type of statements is the Accumulator statement identified by the type character 1 containing the character "1". The second character identifies the type of data accumulated. The format of the Accumulator statement is illustrated in FIG. 15E.

The first character contains 1. The second character contains an alphabetic character identifying the type of data being accumulated. Characters 7-14 contain the name by which this accumulator is referenced. Characters 21-24 contain a value identifying the length of the accumulator when the length is not implied by the data type (character 2). Characters 32-62 is where data is accumulated.

The final Control type of structure statement is the Calculation statement. This type of statement provides a means to make calculations and logical decisions for the primary purpose of assisting in selection of structure variations by supplying textable data and in locating structure data areas in those cases where absolute pointers do not exist but rather relational considerations must be used. The format of these statements are as illustrated in FIG. 15F.

The first character position contains a "2". The second character contains a "C" for calculations or movement of data to an accumulator named in name 1 (characters 7-14). The second character position will contain a "B" or an "F" for logical breaks in statement processing (Backward or Forward jumps) Characters 3-6 may contain a value reflecting constant values for calculations or number of statements to jump forward or backward. Characters 7-14 (name 1) is the name of the accumulator statement that is receiving field in calculation statements. Characters 15-22 (name 2) contains the name of an operand of a calculation statement or of a compare field in a conditional jump statement. Character position 23 contains the symbol for the type of calculation being made or compare relationship. Character positions 24-31 (name 3) contains the name of the statement describing the final operand of a calculation statement or the other compare field in a conditional jump statement.

In a calculation statement with all the name fields, name 2 is acted upon by name 3, in accordance to the calculation symbol (character 23) and the result is placed in the name 1 statement. If name 3 is left blank, the name 1 statement is acted upon by the name 2 statement. If name 3 is blank and the calculation symbol is also blank, the content of the field defined by the name 2 statement is copies into the accumulator identified by name 1. If both name 2 and name 3 are blank, the content of the name 1 accumulator is acted upon by the constant value in character 3-6.

In the jump statement (characters 1-2=2F or 2B), name 1 is not used, and the data defined by the statement named in name 2 is compared to the data defined by the statement named in name 3 in accordance with the compare symbol (character 23). If the compare is true, the jump is made by going forward or backward the number of statements specified by the value in characters 3-6 before processing any more calculation statements.

These Calculation type statements offer a very powerful facility to the program using the Structures file expanding its ability to deal with System Structure sets having fairly complex structure interrelationships.

Reference has been made previously to a general diagram illustrating the principals of the present invention. FIG. 21 now illustrates the hardware employed in carrying out the concepts of the present invention. The hardware may be embodied as a Honeywell DPS 6 model 43. In FIG. 21 there is shown the common bus to which are connected a series of devices including the main memory 202 and memory controller 204. The memory controller 204 controls the transfer of data including program data between the memory 202 and the common bus 200. Also depicted in FIG. 21 is the central processing unit 206 which is coupled to the common bus 200 by way of the memory management unit 208.

In connection with FIG. 21, it is noted that there are a number of controllers that are coupled to the common bus 200. One of these controllers is device 210 which couples to the printer 212. The device 210 may be a multiple device controller. A control line is shown coupled to the printer 212 from this device.

Also coupled from the common bus 200 is a multi-line communications controller 214. The controller 214, inter alia, couples to the video display 216 and keyboard 218.

Also coupled to the common bus is the disk controller 220. The disk controller 220 controls the transfer of information between the common bus 200 and the disk units 222 and 224.

In FIG. 21 the disk unit 222 may store control structure descriptors and may thus be the structures file. The disk unit 224 may be the memory image data file. The counterparts of units 222 and 224 in FIG. 1 are represented by the descriptor file 30 and the structures file 20, respectively. Also, in FIG. 21 the display 216 is analogous to the terminal 12 in FIG. 1 and the printer 212 in FIG. 21 is analogous to the printer 14 depicted in FIG. 1.

As indicated previously, FIG. 21 depicts the hardware configuration of a computer system such as the Honeywell DPS 6 model 43 showing the basic system components. This computer system supports the capabilities of the present invention as used by the preferred processing program, XRAY. The breakdown of the preferred processing program used in enabling the operator to display memory images, is depicted in FIG. 22.

FIG. 22 depicts the preferred processing program in the form of a high level block diagram. The processing program may reside in the main memory. In FIG. 22 the diagram is separated into different levels. There are four mode processors and six controllers. The mode processors include the interactive processor 230, the dump edit simulator 232, the load up processor 234 and analysis processor 236. The controllers include the structure controller 240, the data access controller 250, the command controller 260, the keyboard/display controller 270, the print controller 280 and the house keeping controller 290. FIG. 22 also depicts the subordinate devices relative to each of these controllers.

The interactive processor 230 is a program routine which uses the VDAM communications interface 271 of the keyboard/display controller 270 to prompt for, on the video display 216 (See FIG. 21), and receive from, the user via the keyboard 218 (See FIG. 21), a command placing it in the command buffer 262 of the command controller 260. The interactive processor 230 then passes processing control to the command controller 260 with the requirement that upon completion of the execution of the command, processing control is returned to the interactive processor 230 for further interaction with the user for the next command. This cyclic operation continues until the operator enters a command to cause termination of the interactive process. At that time, processing control is passed to the housekeeping controller 290.

The dump edit simulator 232 decicted in FIG. 22 is a program routine that acts on arguments passed to it from the user to produce a fixed format editing of a memory image. The arguments provided by the user cause specific specialized structures which contain structure description statements, accumulator type statements, and computational statements. The dump edit simulator 232 processes by placing LOCATE commands for those specialized structures in the command buffer 262 and turning over processing control to the command controller 260 requesting control back upon completion of the command. When control is returned, the dump edit simulator 232 then passes control to the structure command processor 282 of the print controller 280 to cause printing of the formatted editing prompted by the specific argument it was acting upon. When the dump edit simulator 232 regains control from the print controller 280 it then processes the next argument. When the limited arguments are exhausted, it passes control to the housekeeping controller 290 to terminate processing.

The load up processor 234 is a group of program routines for loading new structure descriptions into a structures file or to update existing structure descriptions. New structure descriptions may be read in from a file, verified to meet requirements of a structures file, and written to a specified structures file, or loaded statement-by-statement in an interactive tutorial fashion with the user via the display and keyboard depicted in FIG. 21. The updating of existing structures may be done in an interactive fashion by the user, or a file containing a template of a new version of a structure description may be read in, compared and changes extracted to update and/or add to the existing description. The load-up processor 234 interacts with the keyboard/display controller 270, housekeeping controller 290, and the structure controller 240.

In FIG. 22 the analysis processor 236 is a program routine similar to the dump edit simulator 232 and which processes structure names entered by the user via the keyboard 218 (see FIG. 21). The named structures being specialized structures similar to those used by the dump edit simulator which, rather than format and print specific sets of information, make calculations and comparisons following logical trouble shooting procedures to analyze a post-mortem dump of a memory image of a system that has failed at the system level. The specialized structure descriptions used by the analysis processor 236 contain the trouble shooting logic statements and the order of the structure descriptions processed is either a result of decisions made by a structure being processed or is specifically ordered by the user. The analysis processor 236 enables the user to enlist the aid of the computer to search out and eliminate or identify known problems as well.

As indicated previously, FIG. 22 also depicts six controllers. The structure controller 240 is comprised of a group of program routines. As depicted in FIG. 22 there are six such routines identified as the structure selection processor 241, the structure commands processor 242, the get next routine 243, the file access routines 244, the buffer search routines 245, and the structure buffer 246.

The structure selection processor 241 is a group of program routines one of which accepts control from other routines and requests the file access routines 244 to read in a specified structure description. Following this it requests the data access controller 250 to read in the memory image beginning at a specified address for a specified length. This address is specified originally by the routine which calls the structure selection processor 241. This address is possibly modified after the structure selection processor 241 calls the buffer search routines 245 to see if the newly loaded structure description in the structure buffer 246 contains a statement type NL indicating existence of negatively offset data. The specified length is set after the structure selection processor 241 calls the buffer search routines 245 to see if the structure buffer 246 contains a statement type SZ specifying the size of the structure. Next, after the new structure is in the structure buffer 246 and its associated memory image is in the memory image buffer 253, the buffer search routines 245 are called to see if any statements exist with type values between 30 and 99 which define tests to determine if the data in the memory image buffer 253 indicates an alternate version of this structure description is more appropriate for the data. If so, the specified structure is requested to be loaded by the file access routines 244. The structure selection processor 241 finally relinquishes processing control to the structure command processor 242. The structure commands processor 242 is a program routine which calls the buffer search routine 245 to locate in order any calculation statements (type 2C) and any comparison (jump control) statements (types 2B and 2F). When a calculation statement is found the calculation specified in the statement is executed. The operands in calculation descriptor statements in the structure buffer 246. When comparison statements are found the comparison specified in the statement is made and, if true, the specified number of statements (forward or backward) is skipped before looking for more calculation statements. The data used in the calculation or comparison statements is the memory image data in the memory image buffer 253 associated with the fields named by the operands.

The get next routine 243 is a program routine which calls the buffer search routines 245 to locate either a queue defining statement (type Q) or a table defining statement (type TE). If a queue defining field descriptor (type Q) is found the field's associated pointer value is accessed from the memory image buffer 253 and is passed along with the defined structure name to the structure selection processor 241 to load the next of a queue of similar structures. If a table defining statement is found (type TE) the next non-zero table entry in the defined tables associated data in the memory image buffer 253 is moved within the memory image buffer to the offset defined by the statement. If the queue defining statements associated data in the memory image buffer 253 is null or the end of the table is reached the get next routine 243 returns an "end" indication to the routine which called it.

The file access routines 245 represent a group of program routines which read, write and rewrite the structures file (see the structures file in FIG. 23 also refer to the hardware disk unit 222 in FIG. 21). The routine which reads from the structures file 222 into the structure buffer 246 looks in the first statement of each physical record read to obtain the key name of a succeeding record which continues the structure description and then reads that record until no continuation key is found. Another routine calls the buffer search routines 245 to identify the existence of hold statements (type 1H) which are used to retain preceding accumulator statements (types 1A, 1B, 1C & 1D). It locates the last hold statement and compares the structure name defined in that statement with the name of the structure preparing to be read. If they are equal the hold statement is overwritten by the new structure. If they are not equal the new structure is read into the structure buffer 246 beginning at the statement following the hold statement. In this way accumulated information can be retained until the interested structure is read but no longer.

The Buffer search routines 245 are a group of program routines which serve to locate specific information in specific subfields of the statements in the structure buffer 246. One routine will search the statements using statement offset to subfield and length of subfield passed to it by the calling routine, and will commence searching from a specified statement number. Another routine searches only the type subfield looking for the next occurrence of a statement type in a list of types specified by the calling routine.

The structure buffer 246 which is the last routine under the structure controller 240 is an array of 360 statements. Each of these statements is a 62 character statement.

The next controller in FIG. 22 is the data access controller 250. This is a group of program routines including a memory management unit simulator 251, a file access routines 252 and memory image buffer 253. The MMU simulator 251 is a group of program routines that serve to simulate the virtual memory manager of the system from which the memory image data was taken. The major routine is one which converts virtual addresses to the physical addresses which map to the memory image in accordance with the rules of the memory management being simulated. Another routine is activated by special statements in some structure descriptions when processed by the structure commands processor 242 and alters the virtual view of the memory image to accommodate a new set of virtual relationships.

The file access routines 252 represent a group of program routines that are used to read memory image data from the memory image data files. One routine reads the memory image data file (see file 224 in FIGS. 21 and 23). Another reads requested data from the backing store file when the requested data was not memory resident at the time the memory image data file was created. Another routine reads requested data from the communications dump file which contains multi-line communications controller 214 (FIG. 21) resident information.

The memory image buffer 253 is a multi-word buffer. In a preferred embodiment of the invention the buffer is a 1024 word buffer.

The command controller 260 is made up of a group of program routines numbering some six. The first of these is the command access 261. This is a program routine which calls the VDAM communications interface 271 in the keyboard/display controller 270 to prompt for and receive user entered commands into the command buffer 262. The command buffer is a 70 character buffer.

The next routine under the command controller 260 is the command validation 263. This is a program routine which verifies that the entered command or command abbreviation is one of those supported.

The command parsing 264 is a program routine that is called by the individual command routines 265 to acquire from the command buffer 262 the next of any anticipated arguments included with the command. This routine isolates and identifies the length of the next argument and validates its suitability based upon parameters communicated by the calling routine.

The individual command routines 265 represent a group of program routines each of which receives control of the process from the command validation 263, may call command parsing 264 to further define the users desired result, and then calls, logical order, other routines in this and other controllers to accomplish the command. The individual commands are defined elsewhere.

The last routine under the command controller 260 is the hierarchy processor 266. This is program routine that is called by two of the interactive commands, namely the commands LOCATE and WALK and also by a special command RUN and which originates from the dump edit simulator 232 or the analysis processor 236. These interactive commands as well as a complete list of other commands associated with the processing program are described in further detail hereinafter.

These commands prior to calling the hierarchy processor 266 have loaded into the structure buffer 246 the structure description of the target structure and has obtained from that description the hierarchy descriptor statement (type 01) (see also FIG. 15C). The hierarchy descriptor statement is passed to the hierarchy processor 266 after the command routine has inserted any conditional tests and/or actions the user has included in the command arguments and that are used to further define specifics of the hierarchy search process and/or actions (commands) to take place during the process. The hierarchy descriptor processed by the hierarchy processor 266 is set of structure descriptor names of all of the structures between the first structure in the system, which is superior to all other structures, and the targeted structure. Included with the identity of each intervening structure is the name of the field in that structure which is a pointer to the next in the order of the structures. The hierarchy processor 266 starts with the first structure name and field name combination and knowing the fixed location of the first structure calls the structure selection processor 241 in the structure controller 240 to cause that structure descriptor and its associated data from the memory image to be loaded into the buffers. Next the buffer search routines 245 is called to locate field name statement through which the pointer to the next structure is obtained from the memory image buffer 253. At this point the hierarchy descriptor is referenced to see if the current structure name and field name combination contains conditional tests or action requests. The arrangement of tests and actions may logically control continuing order of processing the hierarchy descriptor as the test may merely determine whether or not the action is to be done or it may determine that processing the hierarchy descriptor beyond this point is not to take place until the test is true. This latter situation causes the hierarchy processor 266 to determine if this structure or superior structures are members of a queue of like structures or is a table of like information. This is done by calling the get next routine 243 in the structure controller 240 and acting on results returned.

If the structure is not a queue or a table or if the end of the queue or table has been reached the hierarchy processor 266 steps backward in the hierarchy descriptor to the next previous structure name and field name combination, calls the structure selection processor 241 to load that structure and associated memory image data and it then calls the get next routine 243 looking again for a queued structure or valid table element. When a queued structure or valid table element is found the forward processing of the hierarchy descriptor is continued. Processing continues until the target structure is reached and all tests satisfied or until get next routine 243 usage and backing up in the hierarchy descriptor has processed through all queues and tables and has returned to the first structure name and field name combination in the hierarchy descriptor. The hierarchy processor 266 allows, through processing of the hierarchy descriptor statement, the system to automatically follow a prescribed path to a particular structure that could require the user to enter several interactive commands. The ability of the hierarchy process 266 to make conditional tests and to call get next routine 243 and back up the hierarchy descriptor allows searching for a specific one of what could be many occupancies of a particular structure. This hierarchy processor 266 can relieve the user of entering as many as several hundred interactive commands in searching out a particular structure. The ability of the individual command that calls the hierarchy processor 266 to setup conditional tests on intervening structures allows introduction of user knowledge to permit the hierarchy processor 266 to follow a more direct path to the structure targeted.

The keyboard/display controller 270 is described in FIG. 22 as being separated into three separate program routines. The first is the VDAM communications interface 271. This is a program routine that controls the input of user commands and output of display information by interfacing with VDAM, a system service that communicates with the terminal display unit and keyboard adapting the communications protocol particular to that variety of terminal.

The display buffer setup 272 is a program routine that is called by one of the routines of the individual command routines 265 for the DISPLAY command and calls one of the buffer search routines 245 to locate each of the field descriptor statements in the structure buffer 246. As each statement is located the display buffer setup 272 copies display information from that statement into the display buffer 273 and uses the offset subfield of that statement to locate the associated data in the memory image buffer 253. It then translate that data into a displayable format if necessary and also places it in the display buffer 273. This process continues until all displayable statements have been setup.

Finally, the display buffer 273 is a variable size allocation of memory space acquired through a system process service. This memory space is acquired in one or more requests for memory space under control of the display buffer setup 272 and dependent upon the number of displayable statement.

The next controller depicted in FIG. 22 is the print controller 280. This is representative of a group of program routines including the print selection routine 281, the structure command processor 282 and the print line buffer 283. The print selection is a program routine group that may be called from the individual command routines 265 PRINT routine, the command access 261, and the support functions routines 296 of the housekeeping controller 290. The print selection routines 281 are passed arguments by the calling routines determining what is to be printed and in what mode, raw, full or abbreviated, some things are to be printed. If no arguments are passed VDAM service is called to cause the information currently being displayed on the terminal display unit to be printed. The printing output may be directed to a printer or to an intermediate file for later printing and is controlled by an interactive command.

Next, the structure command processor 282 is a program routine that is called by the dump edit simulator 232 and the analysis processor 236 indirectly through use of requested actions and special structure descriptions containing print action requests in the hierarchy descriptor statements processed by the hierarchy processor 266. When the structure command processor 282 of the print controllers 280 is called it, in turn, calls the buffer search routines 245 to locate print and control statements in the structure description currently in the structure buffer 246 in the order of their existence. The print statements (types 2+ and 2−) are definitions of tests to be made which will control the sequence of the print and control statements being processed by causing skipping forward or backward a defined number of statements and in effect edits the print of information depending upon field associated data in the memory image buffer 253. The print statements of type 2L can load a character string from that statement and/or data from an accumulator statement or data from the memory image buffer 253 associated to a field descriptor in the structure buffer 246, either of which is named in the type 2L statement. The type 2L statement also defines where in the print line buffer 283 the information is to be placed. The type 2P will accomplish the same things as the type 2L but will additionally cause the print line buffer 283 to be printed.

The last category under the print controller 280 is the print line buffer. The print line buffer 283 is a 133 character buffer.

The last controller in the sequence of FIG. 22 is the housekeeping controller 290. This controller is a group of six separate routines. These include the argument processor 291, the process selector 292, the initialize/terminate routines 293, the file manager 294, the memory manager 295 and the support function routines 296. The argument processor is a routine which, when called, isolates individual arguments passed to the program (XRAY) with the users in location of XRAY for use by the other routines of the housekeeping controller 290.

The process selector 292 is a program routine which calls the VDAM communications interface 271 to display on the users terminal display unit a menu of the four mode processors (processors 230, 232, 234 and 236), and to accept in return the users response. It then relinquishes process control to the selected processor.

The initialize/terminate routines are a group of program routines that call the argument processor 291, the file manager 294, the memory manager 295 and the individual command routines 265. During initialization the arguments identify the files to be opened by the file manager 294 and the arguments to be passed to the dump edit simulator 232. During termination the file manager 294 is called to close all files currently in use and the memory manager 295 is called to release all requested memory. During initialization the individual command routines is called with a LOCATE of a special structure named STARTER which determines the nature of the memory management unit to be simulated for the processing of the memory image data file specified by analyzing the associated data and setting up controls that will be used during the processing session.

The file manager 294 is a program routine which will open and verify suitability of named files or will close and release specified files depending upon arguments presented by the calling routine. The calling may be the initialize/terminate routines 293 or individual command routines 265 in cases where additional files are requested for use or existing file changed after the session has begun.

The memory manager 295 is a routine which is called to request by the appropriate means for use of additional memory space when needed by XRAY or to return memory space when no longer needed. The "appropriate means" accommodates differences existing that are dependent upon the host system in which XRAY is processing.

Finally, the support function routines 296 are a group of program routines that provide conversions of data control selections to avoid duplications of printed information, error detection and avoidances of loops, and display of error messages, selection information and help messages.

Reference is now made to the further block diagram of FIG. 23. This diagram illustrates some of the controllers previously identified in FIG. 22 and their interconnection with the peripheral components. In FIG. 23 the same reference characters are used to identify the same parts previously identified in FIGS. 21 and 22. Thus, in FIG. 23 there is provided a structures file 222 that is shown coupled to the structure buffer 246. There is also provided a memory image data file 224 coupled to the memory image buffer 253. The structure buffer 246 is part of the structure controller 240 previously described in FIG. 22. Also, the memory image buffer 253 is part of the data access controller 250 described also in FIG. 22. Part of the processing program illustrated in FIG. 23 also includes the controller 270 illustrating in particular the display buffer 273 thereof. Also illustrated is the command controller 260 and its command buffer 262. The display buffer 273 couples to the display terminal 216. Buffer command signals coupled from the buffer to both the display terminal 216 and the keyboard 218. FIG. 23 also illustrates the print controller 280 and its print line buffer 283.

An example is now given of the manner in which displays may occur in an interactive program which is a debugging program usable by computer programmers. In connection with this example reference is made to FIG. 23 and also to the display formats illustrated in FIGS. 24 and 25.

If it is assumed that through prior action, the structure SCB is currently residing in the structure buffer 246, and its associated memory image data is currently residing in the memory image buffer 253, the display 216 has displayed on its screen the image shown in FIG. 24. Note in the display of FIG. 24 the structure S—GCB which is the linking signal at offset 0006 from the SCB structure to the GCB structure.

If the terminal operator decides to view the first GCB structure it would then be recognized, through prior knowledge or from perusal of the SCB structure displayed in the upper section of the display, access to the GCB structure is through the field named S—GCB. If one also wanted to retain the view of the SCB structure, while viewing the GCB structure, through knowledge of the commands available, one would recognize that the DISPLAY command causes the subject information to be displayed in the lower section of the terminal display leaving the upper section undisturbed. In this connection refer to the display of FIG. 25.

Therefore, by depressing the appropriate keys on the terminal keyboard 218 to enter the command DISPLAY S—GCB followed by depression of the carriage return key, the following actions take place.

1. With depression of the carriage return key the command is validated and the processing of a DISPLAY command is initiated.

2. The processing first determines that the arguments, namely S—GCB, is a field name as opposed to some other arguments possible for a DISPLAY command.

3. The structure buffer 246 is then searched for a statement with the field name subfield containing S—GCB.

4. When that statement is found and it is verified to have a P or a Q in the field type subfield the structure name subfield is found to contain GCB identifying the name of the structure this pointer statement points to.

5. The offset subfield content is 0006 and it used to index into the memory image buffer 253, containing the data associated with the SCB structure, and this pointer value, namely 0009E780, found at that offset is saved. In this regard, note in FIG. 23 the designation of this offset and the associated pointer value. These are stored in the memory image buffer 253.

6. The structures file 222 is now accessed to read a record with a key of GCB. That record and all of its continuation records are read into memory replacing the SCB structure description in the structure buffer 246 with the GCB structure description.

7. The structure buffer 246, now containing the GCB structure description, is searched for statements with type subfields containing NL and SZ. The offset subfield of the NL statement, if one is found, helps determine the true starting location of the GCB structures associated data and the offset subfield of the SZ statement identified the length of the structures associated data.

8. Using the saved pointer per step 5 above, in conjunction with the values from NL and SZ statements per step 7 above, the memory image data file 224 is accessed to read the GCB structures associated data into memory replacing the SCB structures associated data in the memory image buffer 253.

9. The structure buffer 246 is scanned for any statements with type subfields containing numeric values 30 through 99 which are to determine if some other version of the GCB structure is more appropriate to use now that the associated data is visible to the program.

10. The structure buffer 246 is scanned for each field defining statement, statements with type subfields beginning with alphabetic characters. From each of those statements the displayable subfields, offset, name and description are moved to a display line in the display buffer 273. Also, for each of those statements the associated data, defined by the offset and type subfields, is moved from the memory image buffer 253 to the display line in the display buffer 273.

11. The first 8 display lines in the display buffer 273 are transmitted to the lower section of the terminal display screen replacing whatever may have been displayed previously.

12. Upon completion of the above operations, the display is now of the form illustrated in FIG. 25 having upper and lower display sections. In the other section is the segment of the SCB control structure while in the lower segment of the display is the GCB control structure. The terminal operator also has scrolling and paging commands to use in viewing the remaining contents of the display buffer 273.

Reference has been made hereinbefore in the description to the commands of the dump program. A list of these commands is now presented.

Display on a users terminal and/or transfer to the user-out file (in an anotated, edited display) the contents of a previously recorded memory dump file (see MDUMP) or the contents of the current memory. The information to be displayed will be in response to either interactively entered commands from the user, a stream of commands from a command file, or the processing of structures which simulate that which is produced by DPEDIT.

```
FORMAT
     XRAY [Path] [ctl_arg]
ARGUMENTS:
     [path]
          Pathname of the memory dump file to be processed.
     [ctl_arg]
          None or any number of the following control
          arguments may be entered.
          (-CUSTOM_STRUCT)
          (-CS           )
               Pathname of file containing additional or customized
               structures to be included for this user.
               Default: Only structures in the system structures
               file will be available for use.
          -IN
               Pathname of file containing interactive mode user
               commands. If this file is not concluded by a QUIT
               command additional commands are expected from the
               users terminal (std_in).
          (-FILE_OUT)
          (_FO      )
               Pathname of where printable output should be
               directed.
               Default: Standard file_out.
          (-SWAP_FILE)
          (-SF       )
               Pathname of file containing non-memory resident
               information associated to dump file being processed.
               Default: Non-memory resident information at time of
               dump file recording is not available.
          (-PAGE_FILE)
          (-PF       )
               Pathname of file containing non-memory resident
               information associated to dump file of system using
               paging memory management.
               Default: Non-memory resident information at time of
               dump file recording is not available.
          -FORCE
               Forces XRAY to attempt to process dump file
               indicated to have not been successfully completed by
               MDUMP or has since been UNLOCKED (RELDMP command
               executed).
          -DPEDIT
               Dump Edit simulation is requested. XRAY is placed
               in a non-interactive mode and output is directed to
               file_out. At conclusion of DPEDIT simulation XRAY
               terminates.
     Note: The following control arguments relate to DPEDIT
     simulation and must have been preceded in the command line by
     -DPEDIT. This is the only restriction the order of the control
     argument entry must observe.
          (-NO_LOGICAL)
          (-NL        )
               Do not print a logical dump of system control
               structures.
               Default: Print all requests logical dump
               information.
```

-continued

```
(-NO_PHYSICAL)
(-NP        )
    Do not print a physical dump.
    Default: Print physical dump of dump file or memory.
(-NO_FILES)
(-NF      )
    Do not print a logical dump file system structures.
    Default: Print file system structures.
(-GROUP id [id] . . . )
(-GP id [id] . . .    )
    Produce logical dump of group-related structures for
    only the group(s) specified.
    (id is the two-character group identifier)
    Default: Print logical dump of all group-related
    structures.
(-FROM hhhhhhhh)
(-FM hhhhhhhh  )
    Print physical dump from specified address. 0-8
    character hexadecimal value)
    Default: Physical dump will commence at 0.
-TO hhhhhhhh
    Print of physical dump will conclude at specified
    address. (1-8 character hexadecimal value)
    Default: Physical dump will conclude at high memory
    address of dumpfile/memory.
(-NO_SHAREDBU)
(-NS         )
    Do not print shareable and global bound units in the
    logical dump.
    Default: Include printing of all bound units in
    logical dump.
-NO_SYS
    Do not include printing of system information in
    logical dump.
-ME
    Print only the group related structures for the
    group in which XRAY is running. Valid if processing
    current memory and not dump file. Equates to: -NP
    -NS -NO_SYS -GP my_group_id.
-PSYS
    Limit is physical dump to only system space.
The following is a list of XRAY commands for interactive
operation.
    (BACKUP)
    (BACK  )
    (B     )
        Steps back one entry in "current path:" shown in top
        line of screen display. This will cause the new
        last entry of "current path:" to be displayed in
        zone 1. The former last entry is dropped.
    (CHAIN) fld_nme
    (CH   )
        If the field named by fld_nme is valid (found in
        structure currently being displayed) and it is a
        pointer to a structure, the structure pointed to is
        accessed and displayed in zone 1. The structures
        name is appended to "current path:".
    (CONTINUE)
    (C       )
        The last entry in "current path:" is re-displayed in
        zone 1. This refreshes the data being displayed in
        Zone 1 and makes that data current in memory. This
        is important in controlling which zone's data is
        current for displaying indicators or one zone (full
        screen) displays.
    (DISPLAY) (no argument)
    (DISP   )
    (D      )
        The structure and data currently assigned to zone 2
        is redisplayed. The currently assigned structure
        and data that is mostly recently accessed through a
        "DISPLAY fld_nme" command. This refreshes the data
        being displayed in zone 2 and provides the same
        control described for the CONTINUE command relating
        to zone 1.
    (DISPLAY) fld_nme
    (DISP   )
    (D      )
        If the field named by fld_nme is valid (found in a
        structure currently being displayed) and it is a 2
        pointer to a structure, the structure pointed to is
        accessed and displayed in zone 2. There is no
``` effect upon "current path:".
(DISPLAY) IND
(DISP    )
(D       )
    The most recently accessed structure, either zone 1
    or zone 2, is examined for any fields defined as
    indicator or flag fields and the individual
    indicators or flags are displayed in zone 2 if they
    are true. False indicators are not displayed.
(DISPLAY)   (FROM) hhhhhhhh [P]
(DISP    )  (FM   )
(D       )
    The address specified by hhhhhhhh (1-6 hexadecimal
    digits) is accessed and is displayed in zone 2.
    There is no structure associated with this data.
    The USE command will allow association of a
    structure to this data. If the optional P is
    supplied the address is accepted as a physical
    address, otherwise the address is treated as a
    virtual address.
DPEDIT [ctl_arg] . . .
    XRAY will leave interactive mode of operation add
    perform the DPEDIT simulation controlled by any
    included control arguments. See those listed under
    XRAY's ctl_arg arguments.
FO path_name
    XRAY will redirect file_out to the specified path
    named.
(HARDWARE) n
(HARD     )
(HW       )
    The hardware dedicated information for the processor
    specified by n is displayed in zone 2.
HELP [command]
    Help information for the named command is displayed
    below the command line. If no command is specified
    the names of all commands will be shown. Responding
    to a "more?" display with a "Y" will continue
    display of help information.
(LOCATE) str_nme [[ctl_arg]]
(LOC   )
(L     )
    The LOCATE command will find and display the
    structure named by str_nme. If the control argument
    (ctl_arg) it will allow the search to be continued
    until one meeting the test described by the ctl_arg
    is found or all occurances of that structure have
    been tested. Without the ctl_arg the first
    occurance of the structure is displayed in zone 1.
Control Argument Formats:
1.   [A :: B . . . ]
    The control argument must be bounded by square
    brackets ([ . . . ]) and will be one or more tests
    comparing A to B:
    A can be:
        field name in structure
        offset into structure (begins with 0)
    B can be:
        field name in structure
        hexadecimal constant value (begins with 0)
        Ascii character string constant
    :: Comparison can be:
        > Greater than
        < Less than
        = Equal to
        # Not equal to
        + Bit true
        − Bit false
For two or more tests the individual tests are separated by:
        / and test results
        : or test results
2.   [= id]
    This control argument may be used with locate of
    structures containing identifier fields such as G
    NAME in structure GCB.
(MODE)   zone   (R)
(M   )          (P)
                (F)
    Change display mode of specified zone (1 or 2) to
    specified mode:
        R = Raw data display
        P = Packed display showing offset, field name, -continued data content in three columns.
        F = Full display showing offset, field name, data
        content and field description.
(NEXT)
(N    )
    If the current structure in zone 1 is of a queue of
    like structures or is a table of elements XRAY will
    step to and display the next structure or element.
(PAGE UP) zone
(PUP     )
(PU      )
    If the structure in the specified zone has more
    information than is displayed on the screen this
    command will cause the next page (screen) toward the
    beginning of the structure to be displayed.
(PAGE DOWN) zone
(PDN       )
(PD        )
    (See PAGEUP) This will move display down toward the
    end of the structure in specified zone.
(PRINT) (no argument)
(PR   )
(P    )
    The current screen image is sent to file_out.
(PRINT) field_name [mode]
(PR   )
(P    )
    If the named field is valid and is a pointer to a
    structure the information for that structure is sent
    to file_out. The mode of the displayed (printed)
    information defaults to R. See MODE.
(PRINT)  (FROM) hhhhhhhh   (LIMIT) HHHHHH [P]
(PR   ) (FM   )        (LM   )
(P    )
    A raw display of data beginning at FROM address will
    be sent to fill_out and will continue until LIMIT
    number of words have been sent. The FROM address is
    assumed to be a vertical address unless the optional
    P is included to signify a physical address.
(PRINT)  (AUTO)
(PR   ) (MAN )
(P    )
    AUTO causes the screen image to be sent to the
    file_out whenever subsequent commands cause the
    screen to change.
    MAN causes screen images to be printed only upon
    demand.
(QUIT)
(QT  )
(Q   )
    Ends current session of XRAY.
(RESTART)
(RES     )
    Returns XRAY to first interactive screen displaying
    HW and SCB in zones 1 and 2.
(SCROLLUP) zone n
(SUP      )
(SU       )
    Scroll up (toward beginning of structure) the
    specified display zone by the specified n number of
    lines.
(SCROLLDOWN) zone n
(SDN     )
(SD      )
    Scroll down (toward end of structure) the specified
    display zone by the specified n number of lines.
(USE) struct_name zone
(U  )
    Associate the named structure (struct_name) to the
    data being currently displayed in the named zone.
(WALK) struct_name
(W    )
    Locate and display in zone 1 each occurance of named
    structure. As each occurance is displayed the user
    is given the option to end the walk or continue to
    the next.
(ZONES) n (1 or 2)
(ZONE)
(Z   )
    Changes screen format to feature display of both
    display zones (ZONES 2) or apply screen to just one
    of the display zones (most recently displayed zone)

-continued (ZONES 1).

Having now described a limited number of embodiments of the present invention, it should now be apparent to those skilled in the art that numerous other embodiments and modifications thereof are contemplated as falling within the scope of the present invention as defined by the appended claims.

What is claimed is:

1. In a computer system including a central processor, a memory and an interactive user terminal having a display unit, said memory storing a memory image of a number of control structures distributed in an unpredictable manner as a result of running a given operating system on the computer system, said control structures containing information used by said operating system and user routines at the time said memory image was created, a process for enabling a user to locate and display said control structures within said memory image, said process comprising the steps of:

storing an interrogation routine in said memory to be responsive to user commands entered by said interactive user terminal;

storing in a descriptors file separate from said interrogation routine in said memory, a plurality of descriptors which describe the control structures for said given operating system, said step of storing a plurality of descriptors including storing descriptive information which names the control structures for identification and reference by said interrogation routine, descriptive information defining a hierarchical description by which a specified control structure is locatable by said interrogation routine and field defining information that defines the purpose, size and translation of pats of each control structure;

accessing said descriptors by said interrogation routine for control structures contained in said memory image in an order specified by said user commands;

interpreting the accessed descriptors by said interrogation routine in response to said user commands, to locate for display in human readable form on said display unit, specified control structures within said memory image using said descriptive information and said field defining information; and displaying said specified control structures in human readable form on said display unit.

2. A process as set forth in claim 1 including storing statements including selection statements which allow automatic selection of the appropriate description from a plurality of descriptors of a common type.

3. A process as set forth in claim 2 including storing statements including accumulator and calculation statements related to the control structure which allow the interrogation routine to process a specified control structure and to access subsequent control structures.

4. A process as set forth in claim 1 wherein the step of interpreting the accessed descriptors includes interpreting the accessed descriptors to generate a display of control structure field offset, field name and field data.

5. A process as set forth in claim 1 wherein the step of interpreting the accessed descriptors includes interpreting the accessed descriptors to generate a display of control structure field offset, field name, field data and field description.

6. The process of claim 1 wherein said memory image represents a dump file.

7. The process of claim 1 wherein said plurality of descriptors describe control structures for a number of different versions of said given operating system and said step of accessing includes accessing said descriptors for a version of said given operating system which produced said memory image.

8. The process of claim 1 wherein said plurality of descriptors describe control structures for a number of different operating systems and wherein said step of accessing includes accessing said descriptors for said operating system which produced said memory image.

9. In a computer system including a central processor, a memory, software comprising a plurality of software components, a user terminal having a video display unit and an interrogation routine in said memory, a method for location and display of memory resident control structures containing information as to content and location in said memory of said software components of said computer system, in response to user commands supplied through the user terminal to the interrogation routine without requiring the interrogation routine to have knowledge of the content and requirements of each control structure, said method comprising the steps of:

storing a plurality of descriptors, each including a collection of descriptive statements describing the control structures referenced by the interrogation routine, in a descriptors file separate from said interrogation routine, the step of storing a plurality of descriptors including storing descriptive statements which name the structures for identification and reference by the interrogation routine and by other control structures and storing selection statements which allow automatic selection of the appropriate descriptor from a plurality of descriptors of a common type;

accessing the descriptors in the descriptors file in a predetermined order specified by previously-accessed descriptors or by said interrogation routine;

calculating values in response to descriptive statements in said descriptors which allow the interrogation routine to process a specified control structure and to access subsequent control structures; and generating on said video display unit a display of the memory resident control structures in response to the descriptive statements of the accessed descriptors.

10. A method as defined in claim 9 wherein the step of storing a plurality of descriptors includes storing descriptive statements defining a hierarchical description by which a specified control structure is locatable by the interrogation routine and by other control structures.

11. A method as defined in claim 9 wherein the step of storing a plurality of descriptors includes storing descriptive statements that define the purpose, size and translation of the components of each control structure.

12. A method as defined in claim 9 wherein the step of storing a plurality of descriptors includes storing accumulator and calculation statements related to the control structure which allow the interrogation routine to process the control structure and to access subsequent control structures.

13. A method as defined in claim 9 wherein the step of generating a display includes generating a display of memory images of the control structures.

14. A method as defined as claim 9 wherein the step of generating a display includes generating a display of control structure field offset, field name and field description.

15. A method as defined in claim 9 wherein the step of generating a display includes the step of generating a display of control structure field offset, field name, field data and field description.

16. Apparatus for location and display of computer memory resident control structures, said apparatus comprising:

a computer system including a central processor, a memory and an interactive user terminal having a display unit, said memory storing a memory image of a number of control structures distributed in an unpredictable manner as a result of running a given operating system on a computer system, said control structures containing information used by said operating system and by user programs at the time said memory image was created;

means for storing an interrogation routine in said memory to be responsive to user commands entered by said interactive user terminal;

means for storing, in a descriptors file separate from, said interrogation routine in said memory, a plurality of descriptors which describe the control structures for said given operating system, said means for storing a plurality of descriptors including means for storing descriptive information which names the control structures for identification and reference by said interrogation routine descriptive information defining a hierarchical description by which a specified control structure is locatable by said interrogation routine and field defining information that defines the purpose, size and translation of parts of each control structure;

means for accessing the descriptors in the descriptors file by said interrogation routine for control structures contained in said memory image in an order specified by said user commands;

means for interpreting the accessed descriptors by said interrogation routine in response to said user commands to locate for display in human readable form on said display unit specified control structures within said memory image using said descriptive information and said field defining information; and means for generating on said display unit a display of said specified control structures.

* * * * *